United States Patent
Wang et al.

(10) Patent No.: US 12,476,239 B2
(45) Date of Patent: Nov. 18, 2025

(54) METHOD AND SYSTEMS FOR METAL DOPING ON BATTERY CATHODE MATERIALS

(71) Applicant: A123 Systems LLC, Novi, MI (US)

(72) Inventors: Lixin Wang, Belmont, MA (US); Weidong Zhou, Winchester, MA (US); Anil Parmar, Marlboro, MA (US); Fu Zhou, Sichuan (CN); Derek C. Johnson, Fort Collins, CO (US)

(73) Assignee: A123 SYSTEMS LLC, Novi, MI (US)

( * ) Notice: Subject to any disclaimer, the term of this patent is extended or adjusted under 35 U.S.C. 154(b) by 343 days.

(21) Appl. No.: 16/765,842

(22) PCT Filed: Nov. 20, 2018

(86) PCT No.: PCT/US2018/062134
§ 371 (c)(1),
(2) Date: May 20, 2020

(87) PCT Pub. No.: WO2019/104099
PCT Pub. Date: May 31, 2019

(65) Prior Publication Data
US 2020/0365874 A1    Nov. 19, 2020

Related U.S. Application Data

(60) Provisional application No. 62/590,175, filed on Nov. 22, 2017.

(51) Int. Cl.
*H01M 4/04* (2006.01)
*H01M 4/505* (2010.01)
(Continued)

(52) U.S. Cl.
CPC ....... *H01M 4/0459* (2013.01); *H01M 4/0471* (2013.01); *H01M 4/505* (2013.01); *H01M 4/525* (2013.01); *H01M 10/0525* (2013.01)

(58) Field of Classification Search
CPC .. H01M 4/0459; H01M 4/0471; H01M 4/505; H01M 4/525; H01M 10/0525;
(Continued)

(56) References Cited

U.S. PATENT DOCUMENTS 8,709,302 B2    4/2014 Wang et al.
2008/0318131 A1 * 12/2008 Watanabe .............. C01G 53/42
429/231.95
(Continued)

FOREIGN PATENT DOCUMENTS

CN        103872320 A    6/2014
KR     20060051196 A    5/2006
(Continued)

OTHER PUBLICATIONS

Wawrzynczyk et al. ("Neodymium(III) doped fluoride nanoparticles as non-contact optical temperature sensors", Nanoscale, 2012, 4, 6959-6961) (Year: 2012).*

(Continued)

*Primary Examiner* — Matthew T Martin
*Assistant Examiner* — Alexandra J Simmons
(74) *Attorney, Agent, or Firm* — McCoy Russell LLP

(57) ABSTRACT

Methods and systems are provided for a battery cathode material comprising greater than or equal to 60% nickel content, the cathode material having at least one metal doped therein. In one example, a method comprises doping the at least one metal into the cathode material using water as a solvent, wherein the at least one metal has an ionic radii greater than 60 picometers. The at least one metal may be selected from strontium (Sr), barium (Ba), rubidium (Rb), cesium (Cs), zirconium (Zr), niobium (Nb), molybdenum (Mo), technetium (Tc), ruthenium (Ru), tungsten (W), platinum (Pt), neodymium (Nd), yttrium (Y), and cerium (Ce).

19 Claims, 24 Drawing Sheets

(51) Int. Cl.
*H01M 4/525* (2010.01)
*H01M 10/0525* (2010.01)

(58) Field of Classification Search
CPC ...... H01M 50/457; H01M 4/13; H01M 4/382; H01M 4/587; H01M 4/622; H01M 10/0562; H01M 2004/021; H01M 2300/0068
See application file for complete search history.

(56) References Cited

U.S. PATENT DOCUMENTS

| | | | |
|---|---|---|---|
| 2011/0291044 A1 | 12/2011 | Wang et al. | |
| 2015/0221938 A1* | 8/2015 | Yamamoto et al. | H01M 4/525 429/188 |
| 2016/0099469 A1 | 4/2016 | Paulsen et al. | |
| 2016/0164092 A1* | 6/2016 | Stottlemyer | C01G 53/006 252/182.1 |
| 2017/0317344 A1* | 11/2017 | Tan | H01M 10/0525 |
| 2017/0338486 A1* | 11/2017 | Kawakita | H01B 1/08 |
| 2017/0373340 A1* | 12/2017 | Fujii | H01M 4/131 |
| 2020/0335782 A1* | 10/2020 | Oh | H01M 4/525 |

FOREIGN PATENT DOCUMENTS

| | | | | |
|---|---|---|---|---|
| KR | 20140081663 A | | 7/2014 | |
| KR | 20170067082 A | * | 6/2017 | ............. Y02E 60/10 |
| KR | 20170076222 A | * | 7/2017 | .......... H01M 10/052 |
| WO | 2011052607 A1 | | 5/2011 | |
| WO | 2012099265 A1 | | 7/2012 | |
| WO | 2014049976 A1 | | 4/2014 | |
| WO | 2017051338 A1 | | 3/2017 | |
| WO | WO 2017168274 A1 | * | 10/2017 | ............ H01M 4/131 |

OTHER PUBLICATIONS

Breviglieri et al. ("Correlation between ionic radius and thermal decomposition of Fe(II), Co(II), Ni(II), Cu(II) and Zn(II) diethanoldithiocarbamates", Thermochimica Acta 356 (2000) 79-84) (Year: 2000).*

Ates, M. et al., "Mitigation of Layered to Spinel Conversion of a Li-Rich Layered Metal Oxide Cathode Material for Li-Ion Batteries," Journal of the Electrochemical Society, vol. 161, No. 3, Dec. 23, 2013, 12 pages.

Hua, W. et al., "Na-doped Ni-rich LiNi0.5Co0.2Mn0.3O2 cathode material with both high rate capability and high tap density for lithium ion batteries," Dalton Transactions, vol. 43, Aug. 6, 2014, 10 pages.

ISA Korean Intellectual Property Office, International Search Report and Written Opinion Issued in Application No. PCT/US2018/062134, May 24, 2019, WIPO, 12 pages.

Japanese Patent Office, Office Action Issued in Application No. 2020-528040, Sep. 6, 2020, 3 pages. (Submitted with Partial Translation).

* cited by examiner

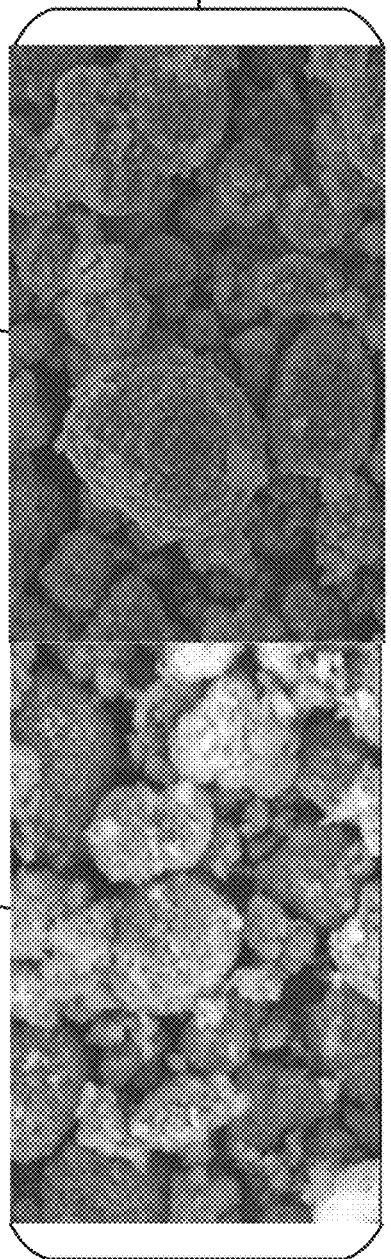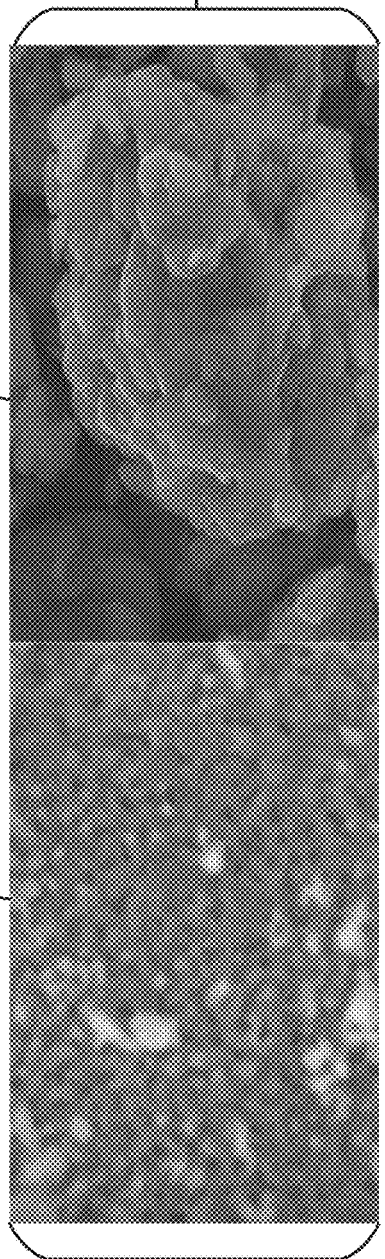

| Sample | Peak-Onset (°C) | Peak-Max (°C) |
|---|---|---|
| NMC baseline-1 | 245.8 | 256.5 |
| NMC baseline-2 | 241.5 | 254.3 |
| NMC baseline-3 | 248.4 | 261.2 |
| 3% Nd-doped NMC -1 | 260.1 | 275.1 |
| 3% Nd-doped NMC -3 | 272.3 | 277.3 |

FIG. 6

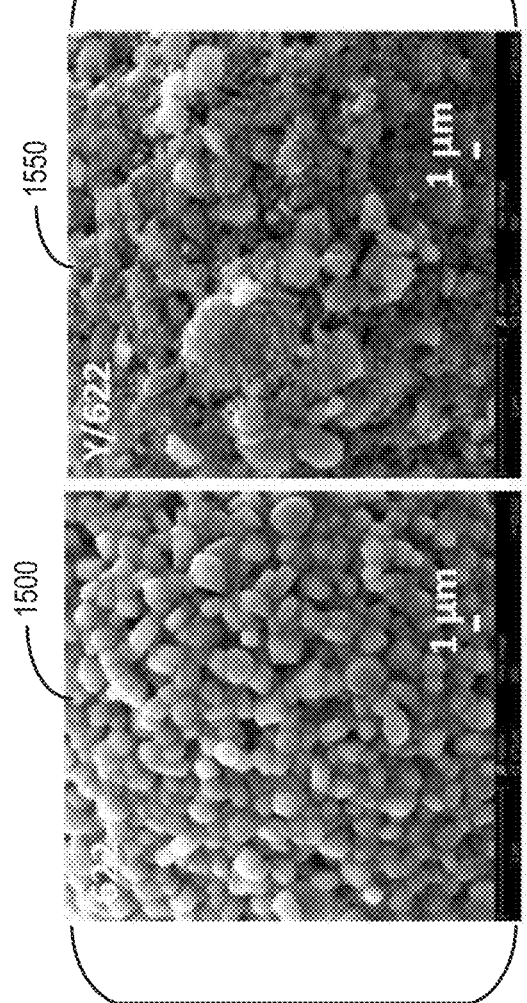
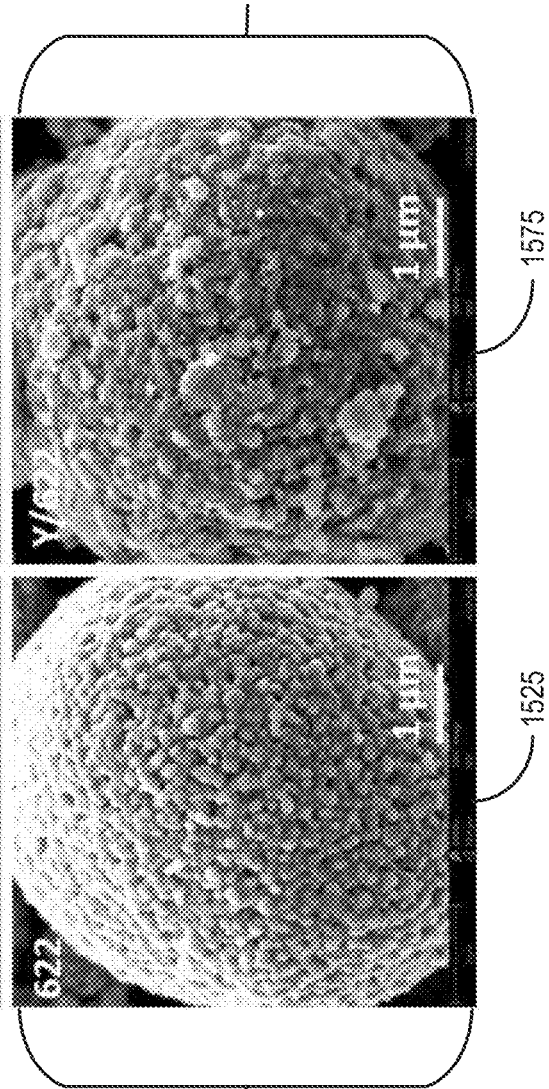
FIG. 15A  FIG. 15C
FIG. 15B  FIG. 15D

METHOD AND SYSTEMS FOR METAL DOPING ON BATTERY CATHODE MATERIALS

CROSS REFERENCE TO RELATED APPLICATIONS

The present application is a US National Phase Application of International Patent Application Serial No. PCT/US2018/062134 entitled "METHOD AND SYSTEMS FOR METAL DOPING ON BATTERY CATHODE MATERIALS," filed on Nov. 20, 2018. International Patent Application Serial No. PCT/US2018/062134_claims priority to U.S. Provisional Application No. 62/590,175, entitled "METHOD AND SYSTEMS FOR METAL DOPING ON BATTERY CATHODE MATERIALS", and filed on Nov. 22, 2017. The entire contents of the above-listed applications are hereby incorporated by reference for all purposes.

FIELD

The present description relates generally to methods to synthesize and implement cathodes comprising metal doping and a high concentration of Ni in lithium ion batteries.

BACKGROUND AND SUMMARY

Lithium (Li) ion batteries may be desired due to their high energy density. Li ion batteries have become ubiquitous and may be found in a wide range of electrically powered or electrically assisted devices, such as vehicles, phones, audio devices, laptops, and the like.

During the charging process of a Li ion battery, a power source may promote the movement of Li ions from a cathode material crystal structure, to an adjacent electrolyte, and finally to an anode surface, where the Li may intercalate into an anode material structure. The forced movement of the Li ions from cathode to anode may cause collapse of the cathode crystal structure and leave nickel (Ni) ions in a highly reactive valence state. The vacant Li ion sites may be prone to Ni ion migration, where the Ni may migrate from a metal oxide layer of the cathode to form a rock salt phase during the charging. As a result, a structure of the cathode may be degraded and may block Li ion transport back to the cathode during a discharge, thereby decreasing an overall power output and longevity of the Li battery.

At an end of charge process, Li extraction from the cathode may not provide enough electrons demanded by a power supply, which may be especially exaggerated during an overcharge process. To appease the electron demand, Ni, Co, and Mn may begin to shed electrons. Thus, oxidation states of each of the metals increase, where, for example, Ni may go from $Ni^{3+}$ to $Ni^{4+}$, and oxygen may be released from the crystal structure to maintain a valence equilibrium. The oxidation may be exothermic and the combination of heat and oxygen may lead to thermal run-away of the Li ion battery.

Previous attempts to address the issue described above with respect to the charging process may include doping elements with similar radius as Ni, Mn or Co, such as Al and Ti into the Ni, Co and Mn layer of the crystal structure of the cathode. This may not enlarge the Li layer of the cathode and ensure Li ion transportation during charge and discharge. In this invention, elements with radii larger than Ni, Co and Mn are doped into the Li layer of the cathode crystal structure. This will enlarge the c-direction Li pathway for better Li mobility during charge and discharge.

Multiple ways have been developed to dope elements into NMC crystal structure. However, the inventors herein have recognized potential issues with such systems. As one example, during the synthesis of high nickel (e.g., $\geq 60\%$) cathode material, metal dopants are incorporated during a co-precipitation step (herein referred to as "wet doping"), wherein a waste flow containing the dopant species (e.g., metal dopant salt) is formed. This increases a manufacturing cost of the Li ion battery due to excess of the dopant and other compounds being present.

As another example, if metal dopant salt is introduced during a lithiation sintering step (herein referred to as "dry doping"), a variety of restrictions may detract from the efficiency of the doping. For example, the melting and evaporation temperature of the dopant salts may to be close to a lithiation sintering temperature of a Ni, Mn, Co (NMC) precursor to optimize doping efficiency. Furthermore, a solid phase reaction between the dopant salts and the NMC powder may limited by reaction kinetic and may be a relatively slow rate-limiting step, leading to poor efficiency of time and other resources. Additionally, the dopant salts may react with Li salts under certain temperatures, thereby decreasing a yield and/or doping efficiency. The above restrictions may severely limit types of dopant salts that may be used and may cause aggregation of a final product. For example, it is desired to use a dopant salt which melts at a temperature similar to the lithiation temperature of NMC precursor and where the dopant salt will not react with Li salts at the melting temperature or temperatures lower than the melting temperature, leading to a limited number of possible dopant salts suitable for the solid-phase reaction.

As a further example, doping the dopant salts onto a NMC powder with non-aqueous solution (herein referred to as "diffusion doping") in a wet phase may introduce some issues. Organic solvents are used to avoid Li leach into the aqueous solution. Organic solvents are more expensive than water and may further demand proper disposal, which may incur additional manufacturing costs, and may pose health risks to workers.

In one example, the issues described above may be addressed by a method for dissolving a dopant salt in water, the dopant salt comprising one or more of a transition metal and a lanthanide having ionic radii greater than 60 picometers, mixing a nickel, manganese, and cobalt oxide (NMC) powder with the dopant salt in water, and heating the mixture to form a doped cathode material. In this way, a high nickel cathode material may be doped with relatively large elements, which may enlarge a lithium pathway along the c-direction of the NMC crystal structure and alleviate its obstruction during cycling. Further, lithium ions may be forced to re-enter the NMC crystal structure via a sintering of the mixture.

As one example, the metals and lanthanides which may be doped into the NMC powder include one or more of strontium (Sr), barium (Ba), rubidium (Rb), cesium (Cs), zirconium (Zr), niobium (Nb), molybdenum (Mo), technetium (Tc), ruthenium (Ru), tungsten (W), platinum (Pt), neodymium (Nd), samarium (Sm), cerium (Ce), yttrium (Y), praseodymium (Pr), and lanthanum (La). These elements comprise atomic radii greater than 60 picometers (0.6 angstrom) and may sufficiently enlarge the lithium pathway, which may not be achieved by dopants having atomic radii similar to Ni, or less than 60 picometers. The dopant may form a secondary phase material on surfaces of the NMC powder during the doping process, which may limit side reactions between electrolytes and the cathode materials.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4A-4D show scanning electron microscope (SEM) images of a NMC doped with Nd and an un-doped NMC.

FIGS. 4A-4B show SEM images of a NMC doped with Nd.

FIGS. 4C-4D show SEM images of an un-doped NMC.

FIG. 6 shows a table depicting peak temperatures of an un-doped NMC and a 3% Nd doped NMC.

FIGS. 15A-15D show SEM images of a NMC diffusion doped with yttrium nitrate and an un-doped NMC.

FIG. 15A shows a 20,000× magnification SEM image of an un-doped NMC.

FIG. 15B shows a 40,000× magnification SEM image of an un-doped NMC.

FIG. 15C shows a 20,000× magnification SEM image of a Y diffusion doped NMC when a dopant salt is yttrium nitrate.

FIG. 15D shows a 40,000× magnification SEM image of a Y diffusion doped NMC when a dopant salt is yttrium nitrate.

FIG. 17A shows a plot illustrating impedance of a fresh un-doped NMC cathode and a fresh 3% Y doped NMC cathode.

FIG. 17B shows a plot illustrating impedance of an un-doped NMC cathode and a 3% Y doped NMC cathode during a 3rd cycle at 3.9 V.

FIG. 17C shows a plot illustrating impedance of an un-doped NMC and a 3% Y doped NMC cathode during a 100th cycle at 3.9 V.

FIG. 17D shows cyclic voltammograms for an un-doped NMC cathode and a 3% Y doped NMC cathode.

DETAILED DESCRIPTION

The following description relates to systems and methods for a Li ion battery having one or more metals and lanthanides integrated in a cathode material. The cathode comprising the one or more metals may be used in a Li ion battery with an anode, such as the Li ion battery of FIG. 1.

Figure 2:
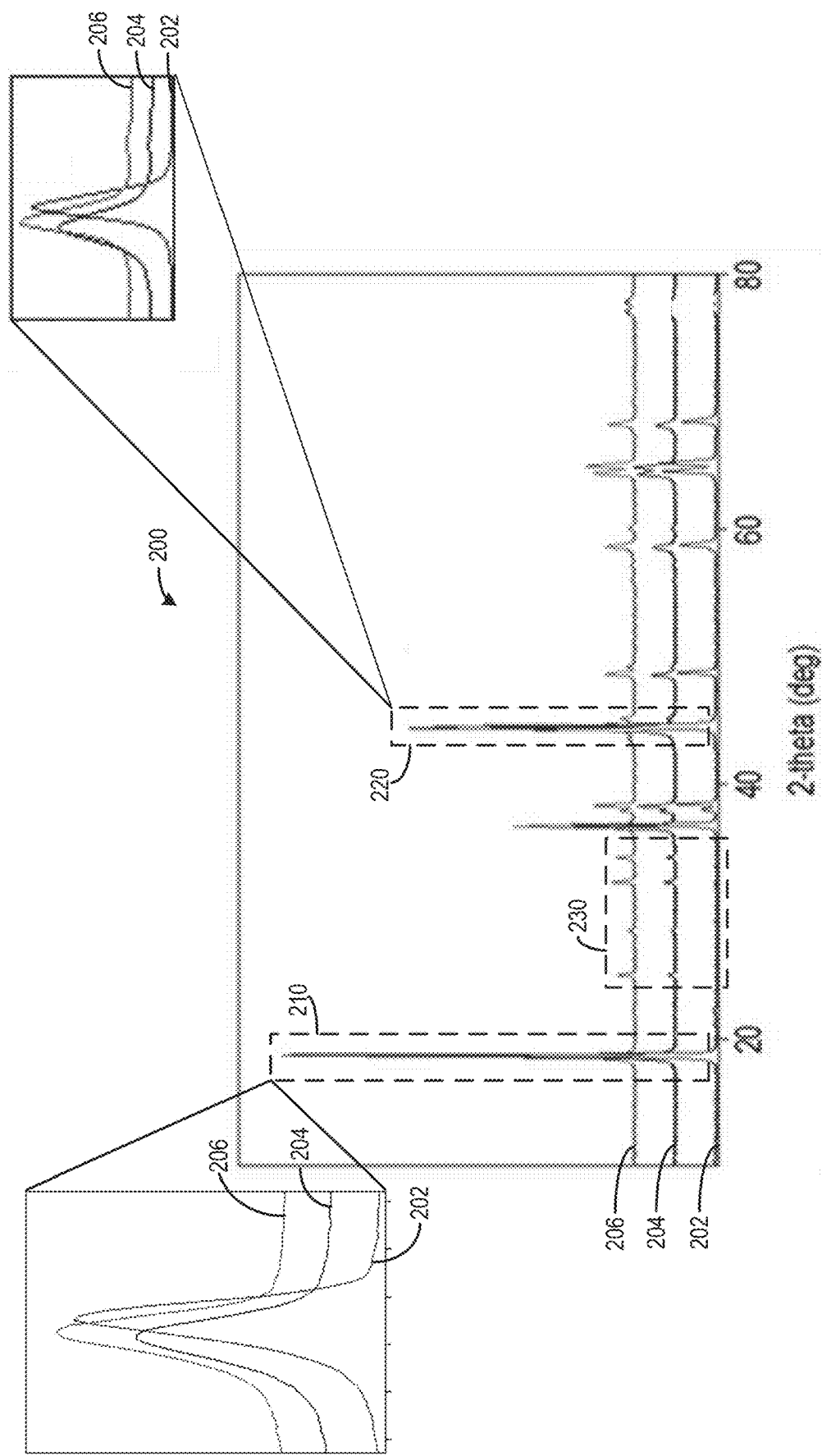
FIG. 2 shows x-ray diffraction (XRD) patterns of an un-doped lithium nickel manganese cobalt oxide (NMC) and a NMC doped with two different Nd salts.
Figure 3:
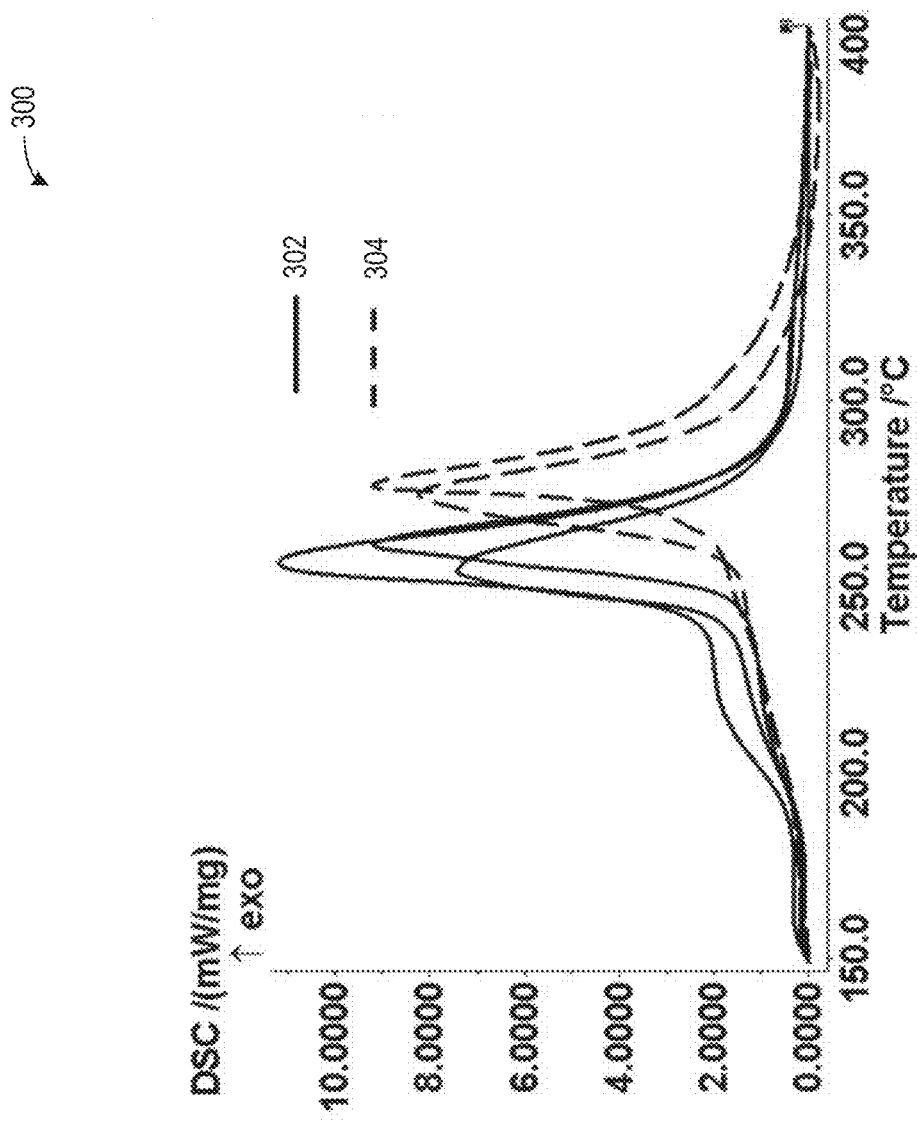
FIG. 3 shows differential scanning calorimetry (DSC) curves of an un-doped NMC and NMC doped with Nd.
Figure 5:
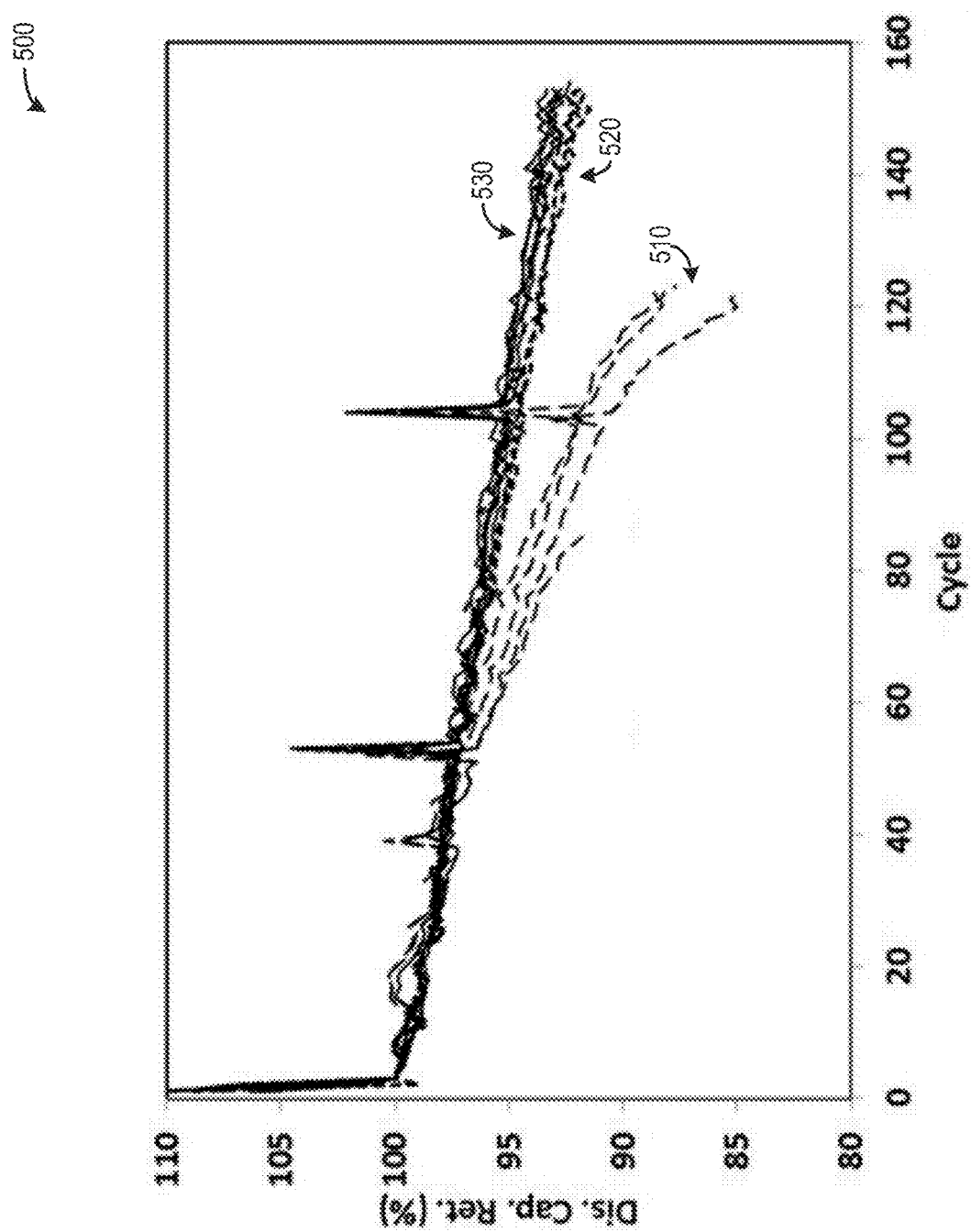
FIG. 5 shows a plot illustrating cycle lives of an un-doped NMC and a NMC doped with Nd.
Figure 19:
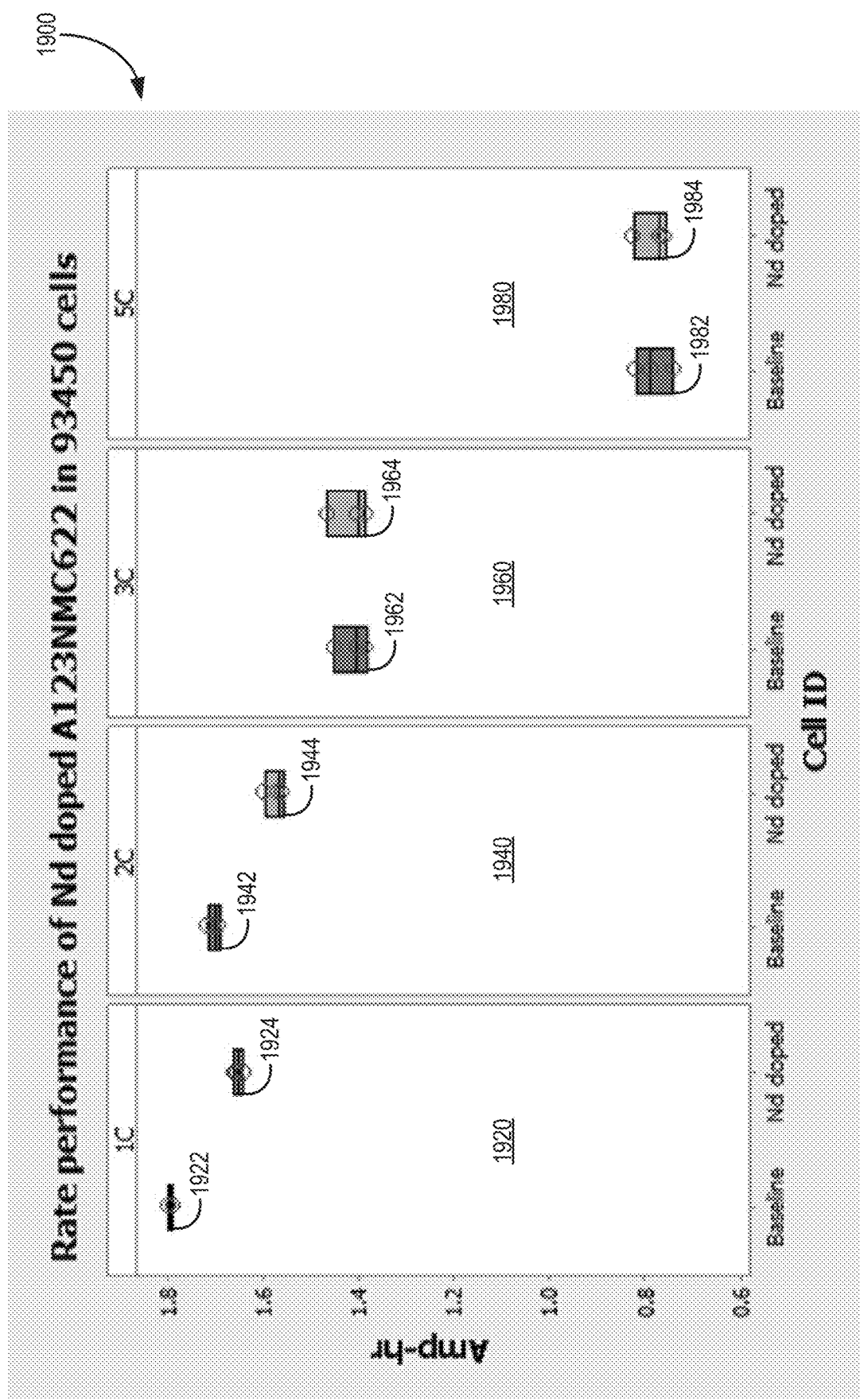
FIG. 19 shows a plot comparing rate performances of an un-doped NMC and a 3% Nd doped NMC in 93450 format cells.
Figure 20:
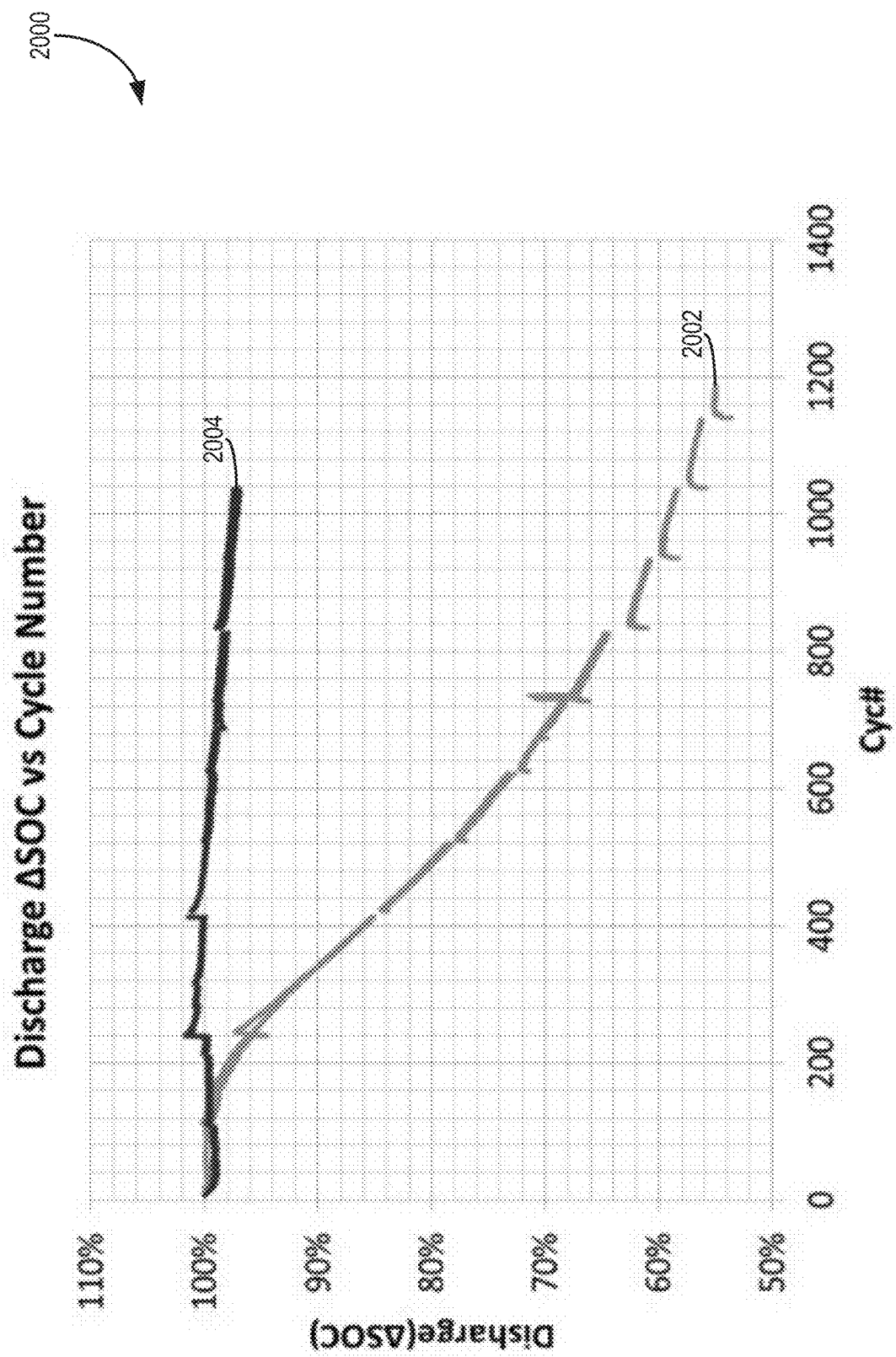
FIG. 20 shows capacity retention during 45° C. cycling of an un-doped NMC and a 3% Nd doped NMC in 93450 format cells.
Figure 21:
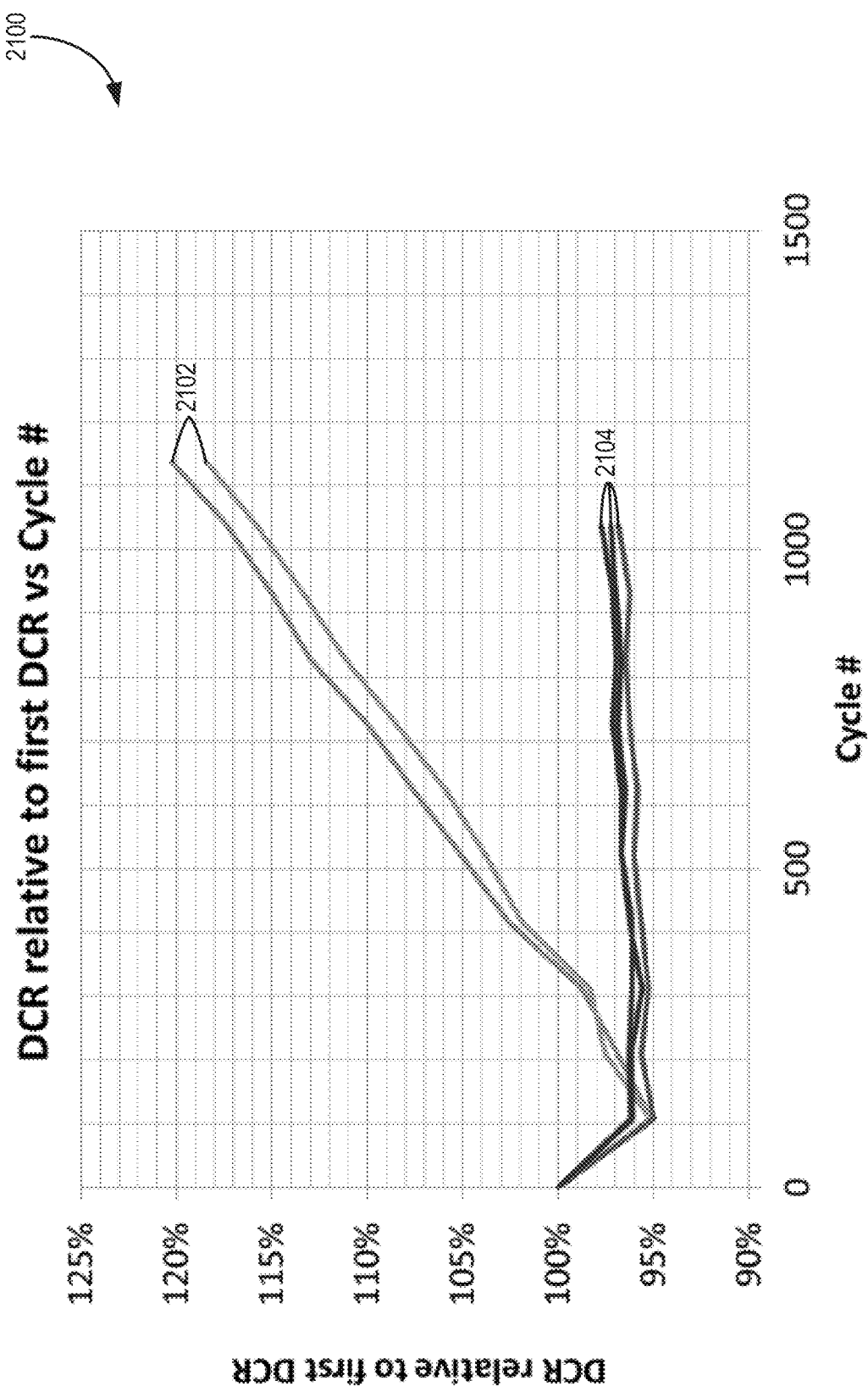
FIG. 21 shows relative direct current resistance (DCR) during 45° C. cycling of an un-doped NMC and a 3% Nd doped NMC in 93450 format cells.
Figure 22:
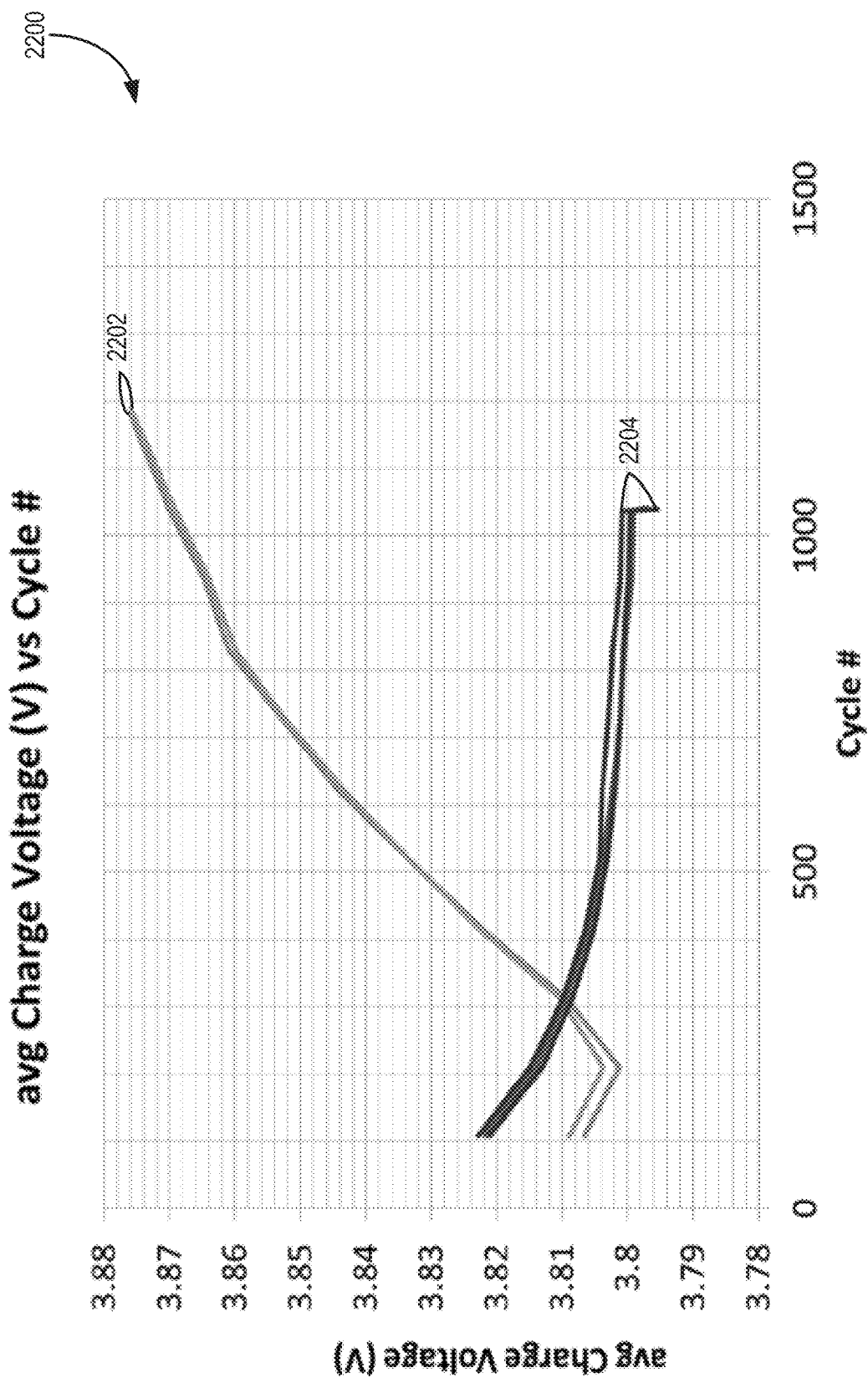
FIG. 22 shows average charge voltage during 45° C. cycling of an un-doped NMC and a 3% Nd doped NMC in 93450 format cells.
Figure 23:
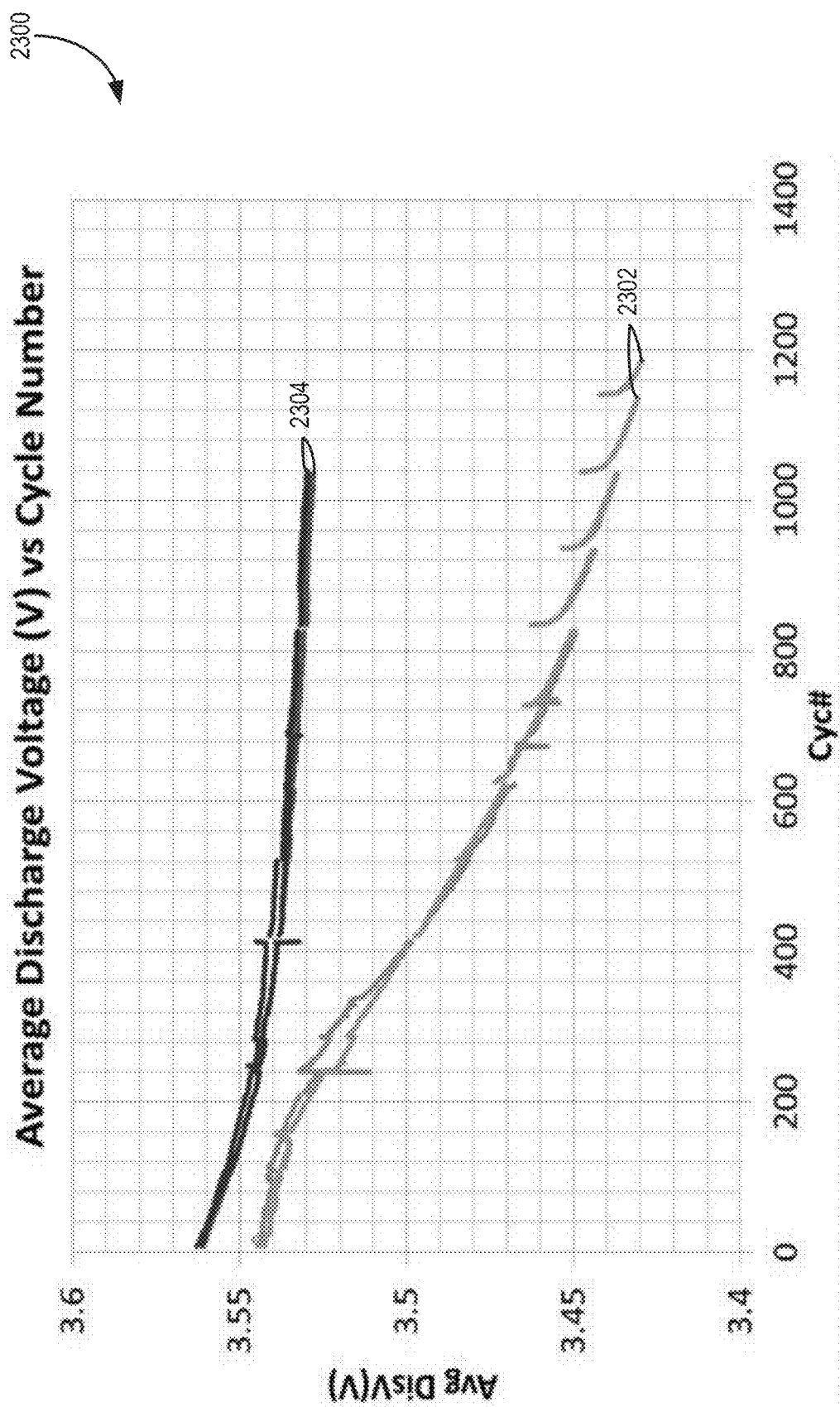
FIG. 23 shows average discharge voltage during 45° C. cycling of an un-doped NMC and a 3% Nd doped NMC in 93450 format cells.
Figure 24:
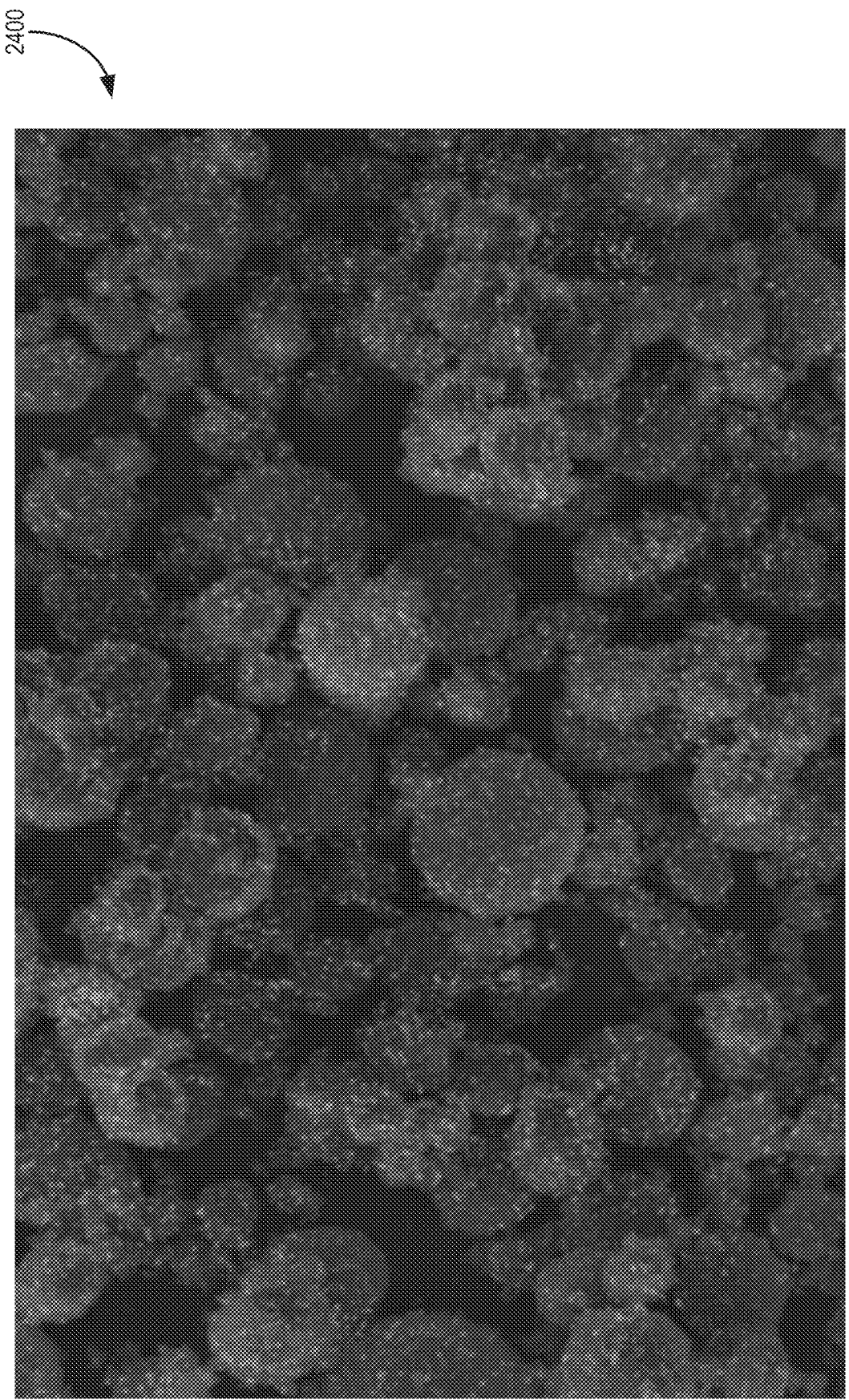
FIG. 24 shows energy dispersive spectroscopy (EDS) mapping of a Nd doped NMC powder.

FIGS. 2-6 and 19-24 illustrate a plurality of changes in appearance, properties, and performance of $LiNi_{0.6}Mn_{0.2}Co_{0.2}O_2$ (NMC622) cathode materials doped with neodymium (Nd). XRD patterns of NMC622 powders are shown in FIG. 2. In some examples, the XRD patterns show peaks for two NMC622 solids doped with different Nd salts. FIG. 3 shows DSC plots of un-doped NMC622 powder and NMC622 doped with Nd, indicating a higher heat release peak for the NMC622 doped with Nd. SEM images of NMC622 doped with Nd are shown in FIGS. 4A-4B. SEM images of un-doped NMC622 are shown in FIGS. 4C-4D. Cycle lives of un-doped NMC622 and NMC622 doped with Nd are shown in FIG. 5, indicating that NMC622 doped with Nd maintains higher discharge capacity retention. A table illustrating peak onset and peak max temperatures of un-doped NMC622 and NMC622 doped with Nd is shown in FIG. 6, indicating greater thermal stability for NMC622 doped with Nd. Charts comparing rate performances of un-doped NMC622 and 3 wt. % Nd doped NMC622 in 93450 format cells are shown in FIG. 19, indicating that NMC622 doped with Nd maintains capacity at 3 C and above. Capacity retention during 45° C. cycling of un-doped NMC622 and 3 wt. % Nd doped NMC622 are shown in FIG. 20, indicating that 3 wt. % Nd doped NMC622 increased cycle performance as compared to un-doped NMC622. Relative direct current resistance (DCR) curves measured during 45° C. cycling of un-doped NMC622 and 3 wt. % Nd doped NMC622 are shown in FIG. 21, indicating that 3 wt. % Nd doped NMC622 maintains DCR following 200 cycles. Average charge voltage during 45° C. cycling of un-doped NMC622 and 3 wt. % Nd doped NMC622 are shown in FIG. 22, indicating that 3 wt. % Nd doped NMC622 maintains a lower average charge voltage following 300 cycles as compared to un-doped NMC622. Average discharge voltage during 45° C. cycling of un-doped NMC622 and 3 wt. % Nd doped NMC622 are shown in FIG. 23, indicating that 3 wt. % Nd doped NMC622 maintains a higher average discharge voltage as compared to un-doped NMC622. An energy dispersive spectroscopy (EDS) mapping of Nd doped NMC622 powder is shown in FIG. 24.

Figure 9:
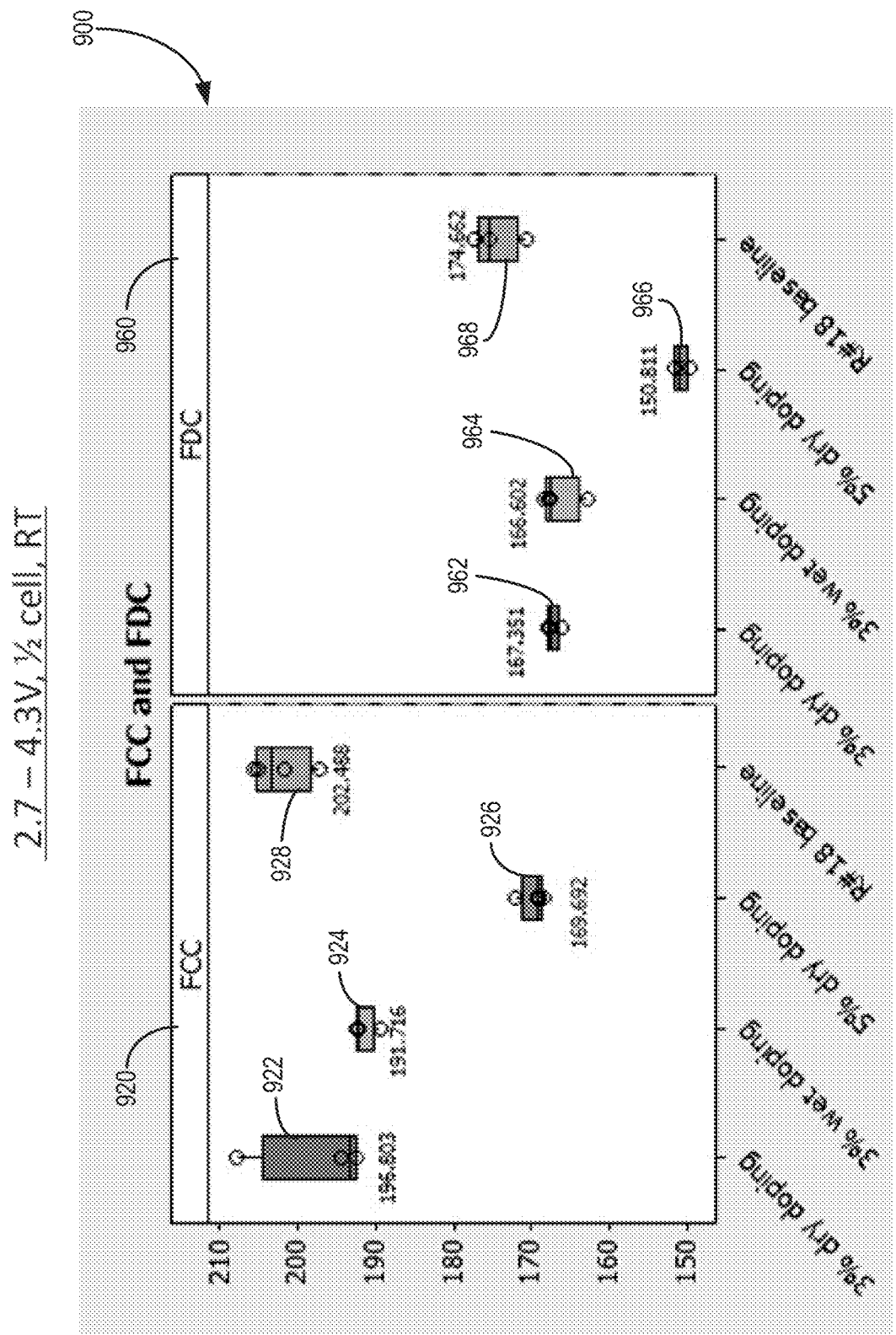
FIG. 9 shows a plot illustrating an impact of dry and wet doping with yttrium acetate on first charge capacity (FCC) and first discharge capacity (FDC).
Figure 10:
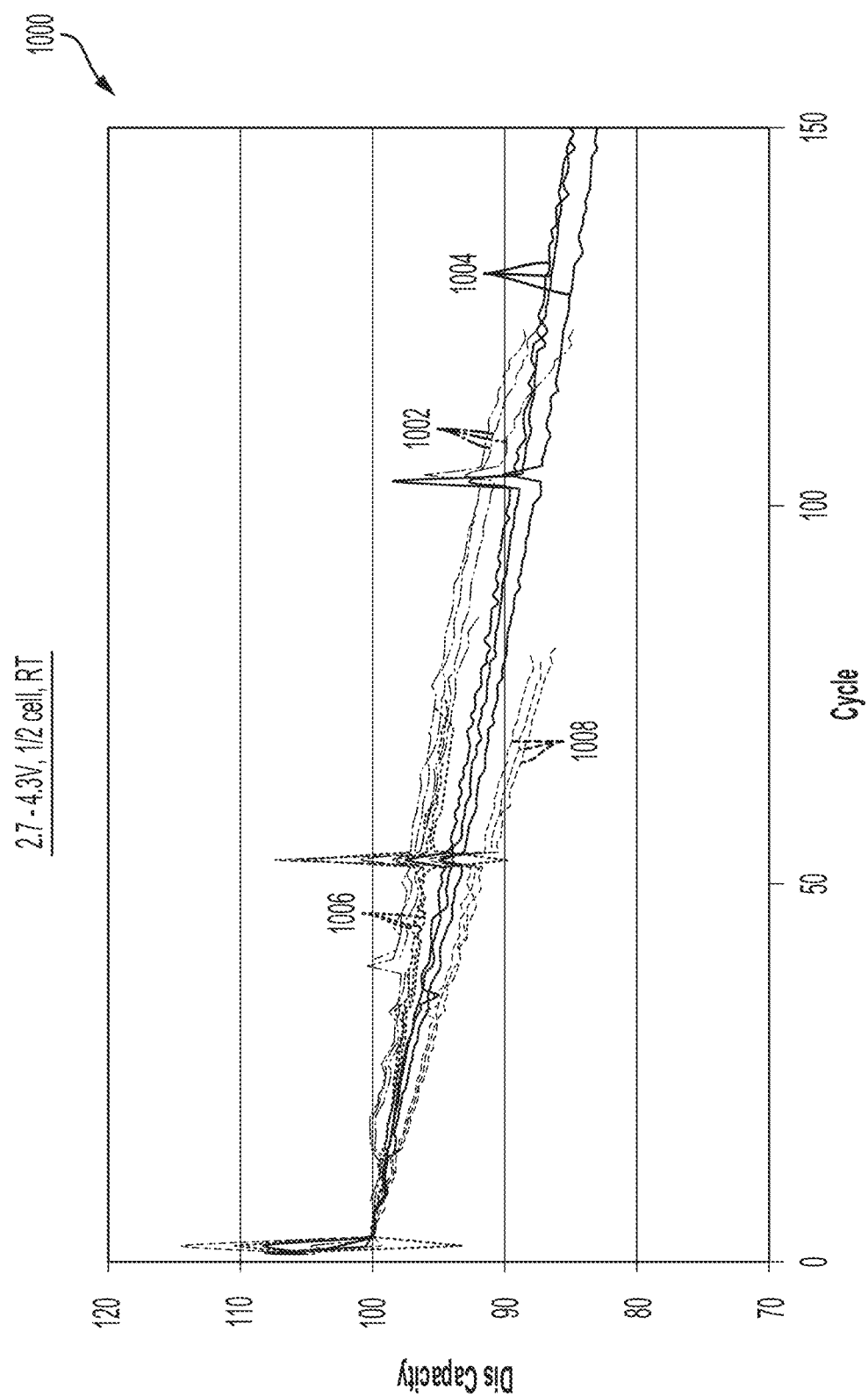
FIG. 10 shows a plot displaying an impact of dry doping with yttrium acetate on cycle life of a NMC.
Figure 11:
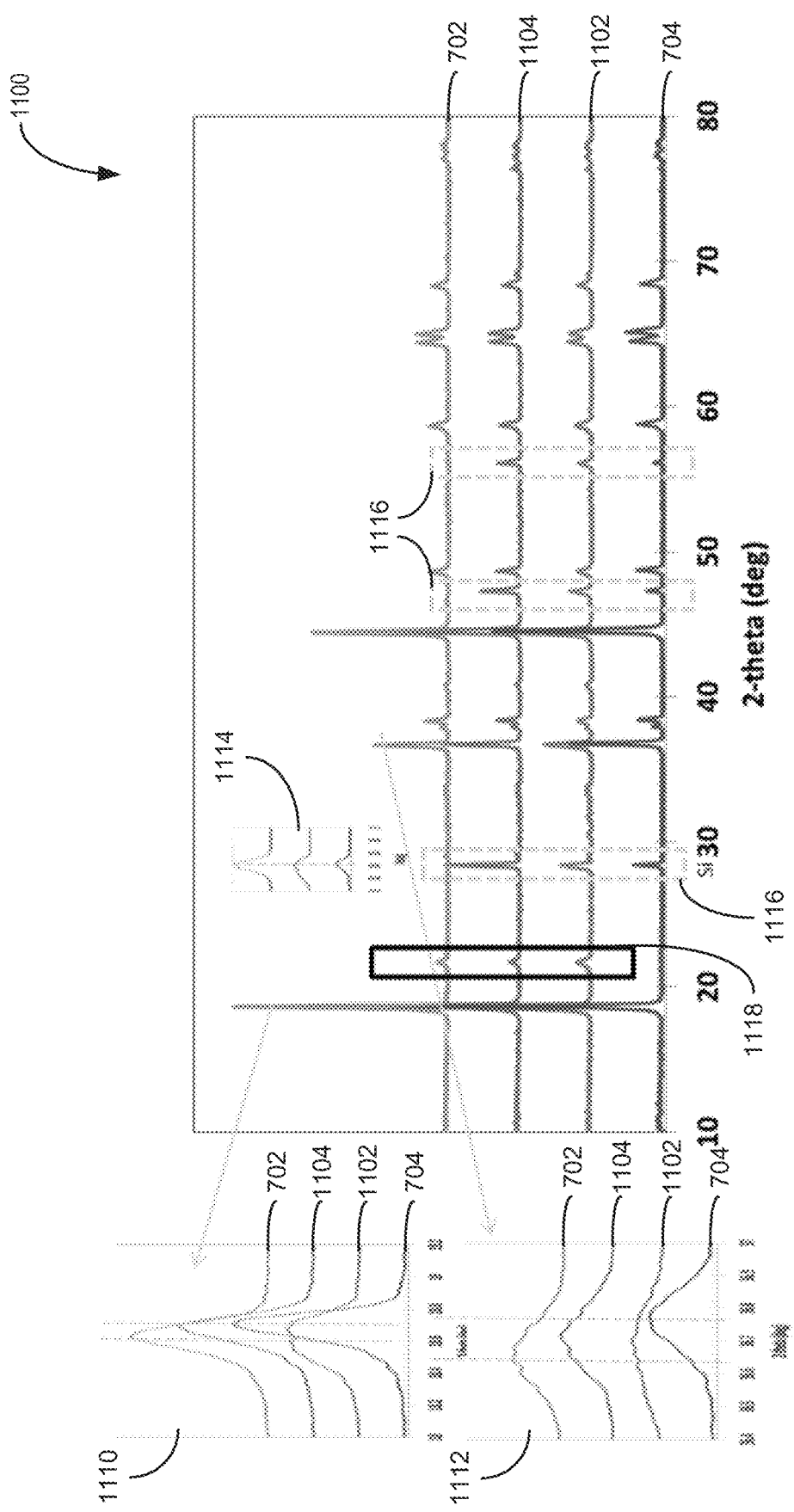
FIG. 11 shows a plot representing an impact of yttrium acetate doping methods and amounts on crystal structure of a NMC.
Figure 12:
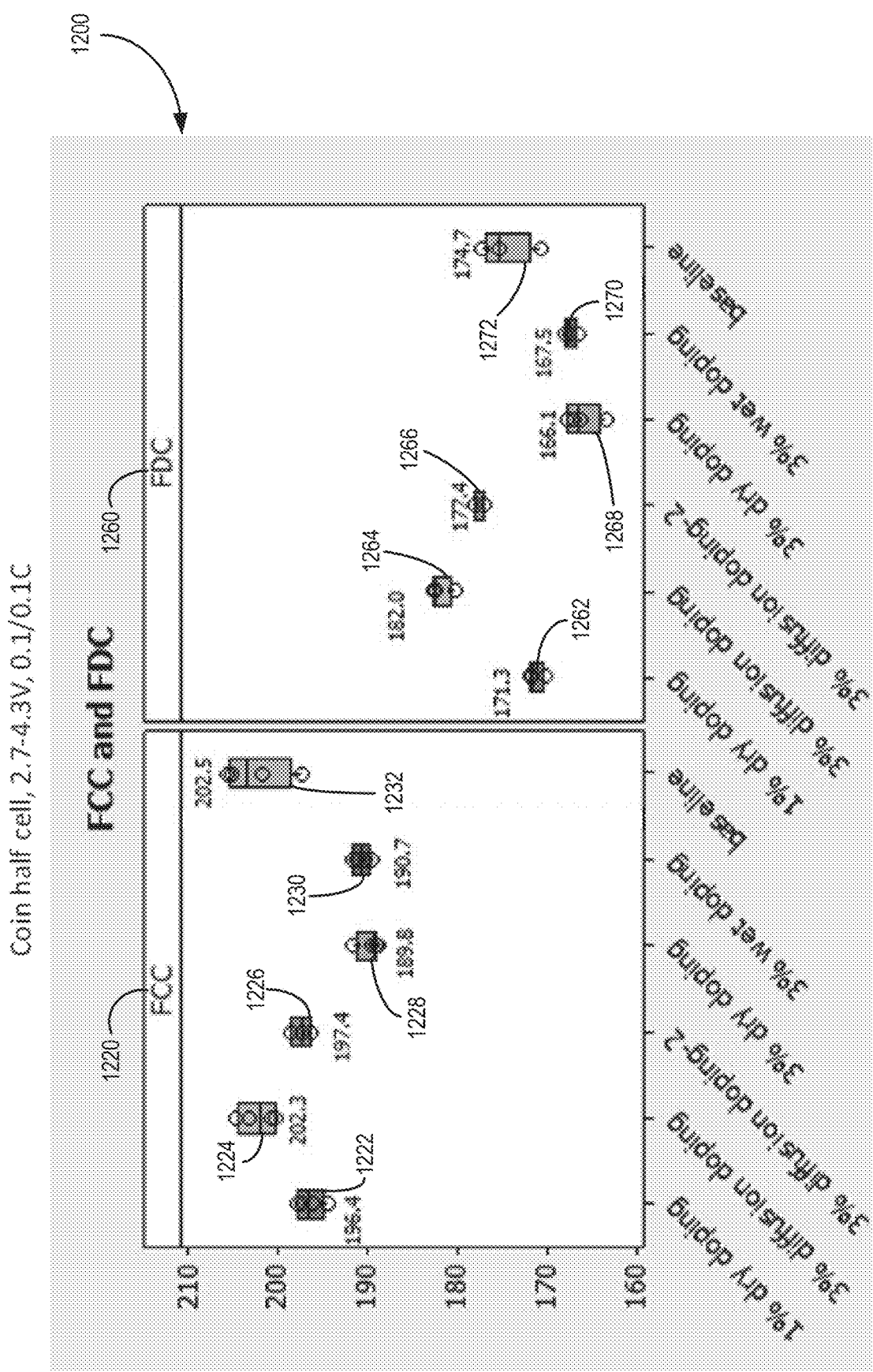
FIG. 12 shows a plot illustrating effects of diffusion doping in NMC with yttrium nitrate on FCC and FDC.
Figure 13:
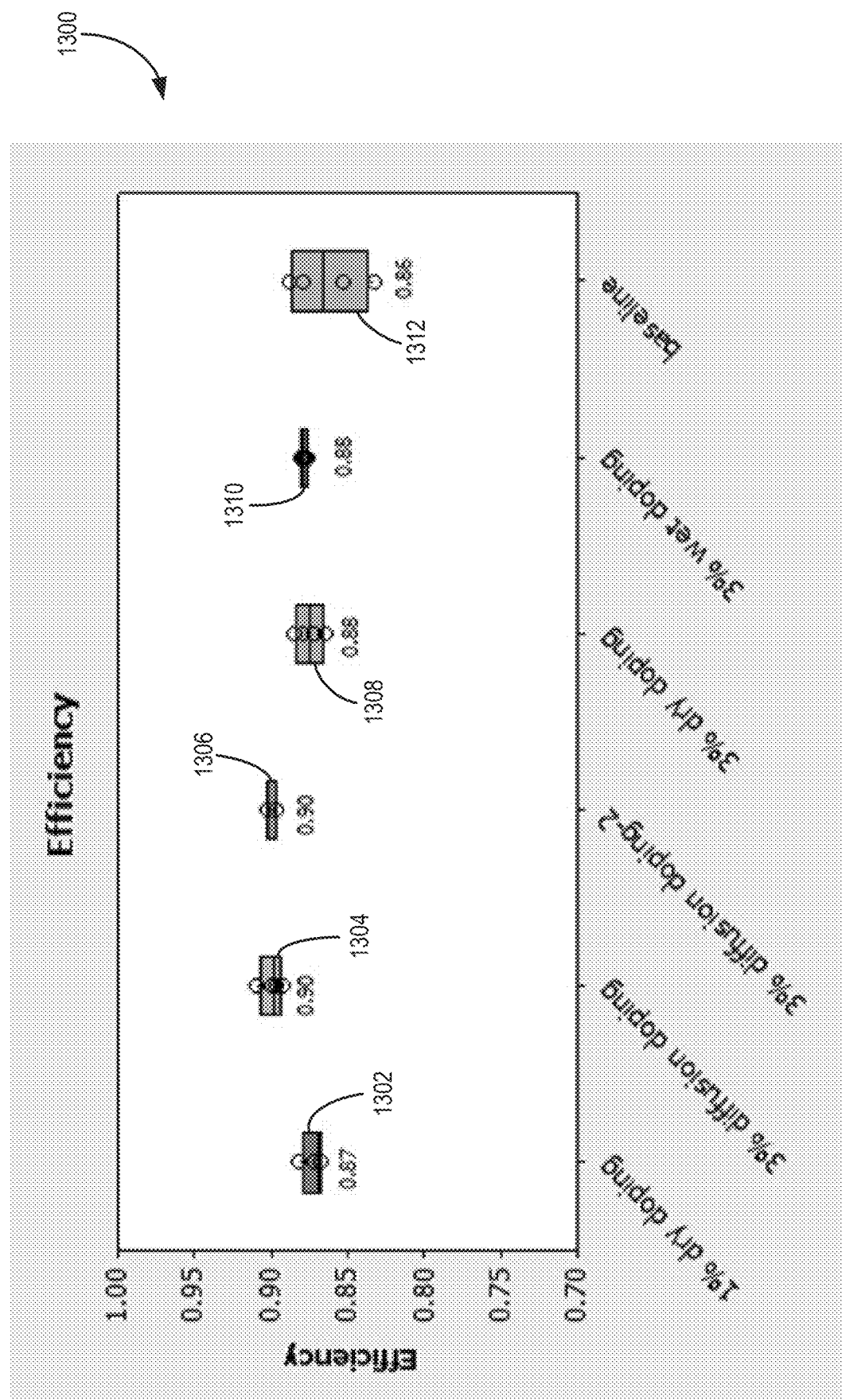
FIG. 13 shows a plot displaying effects of diffusion doping with yttrium nitrate on cathode material efficiencies.
Figure 14:
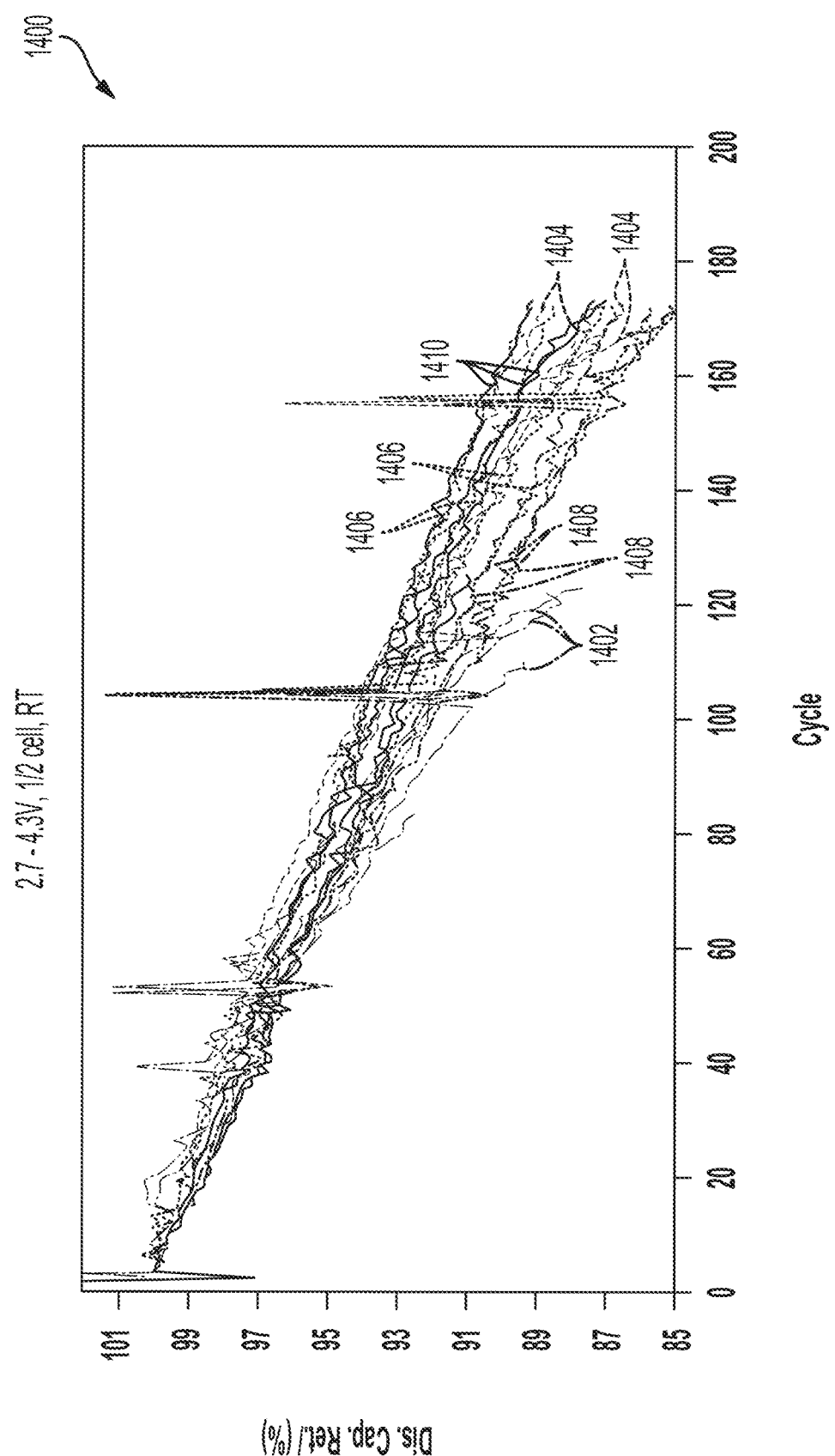
FIG. 14 shows a plot depicting an effect of doping a NMC with yttrium nitrate on cycle life.
Figure 16:
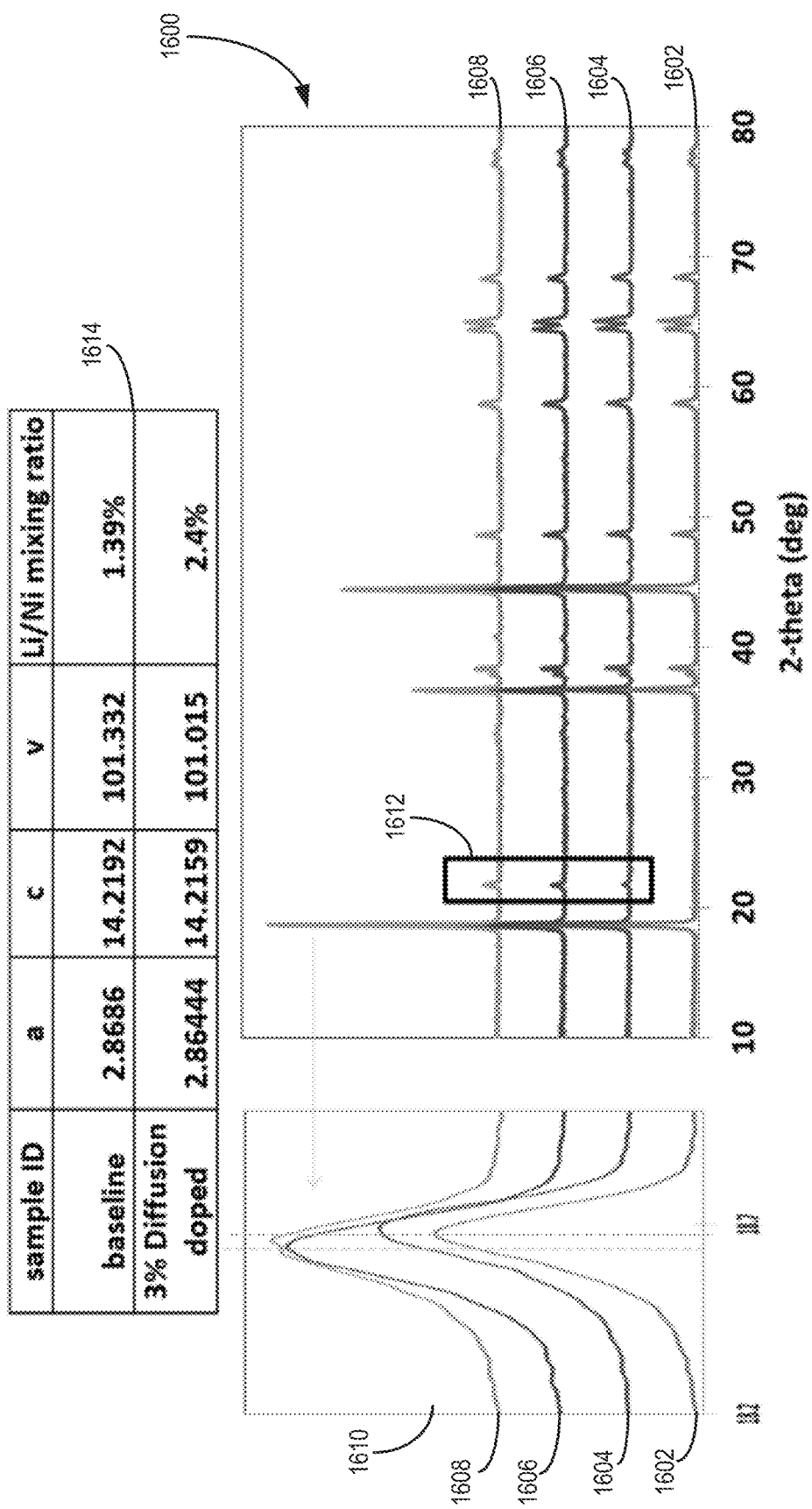
FIG. 16 shows a plot displaying an impact of diffusion doping with yttrium nitrate on XRD patterns.
Figure 17:
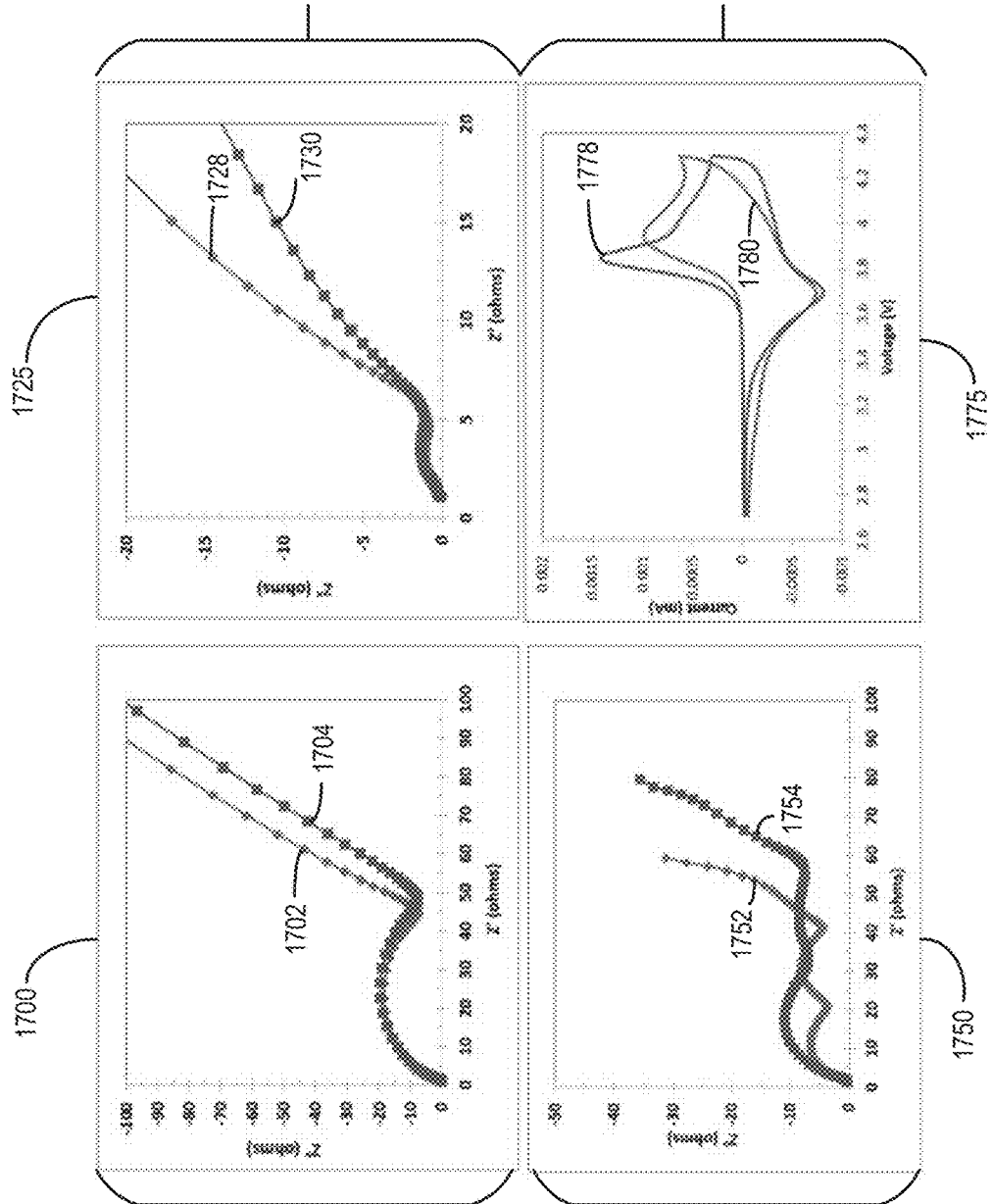
FIGS. 17A-17D show plots illustrating impedance and cyclic voltammetry of an un-doped NMC cathode and a 3% Y doped NMC cathode during cycling.
Figure 18:
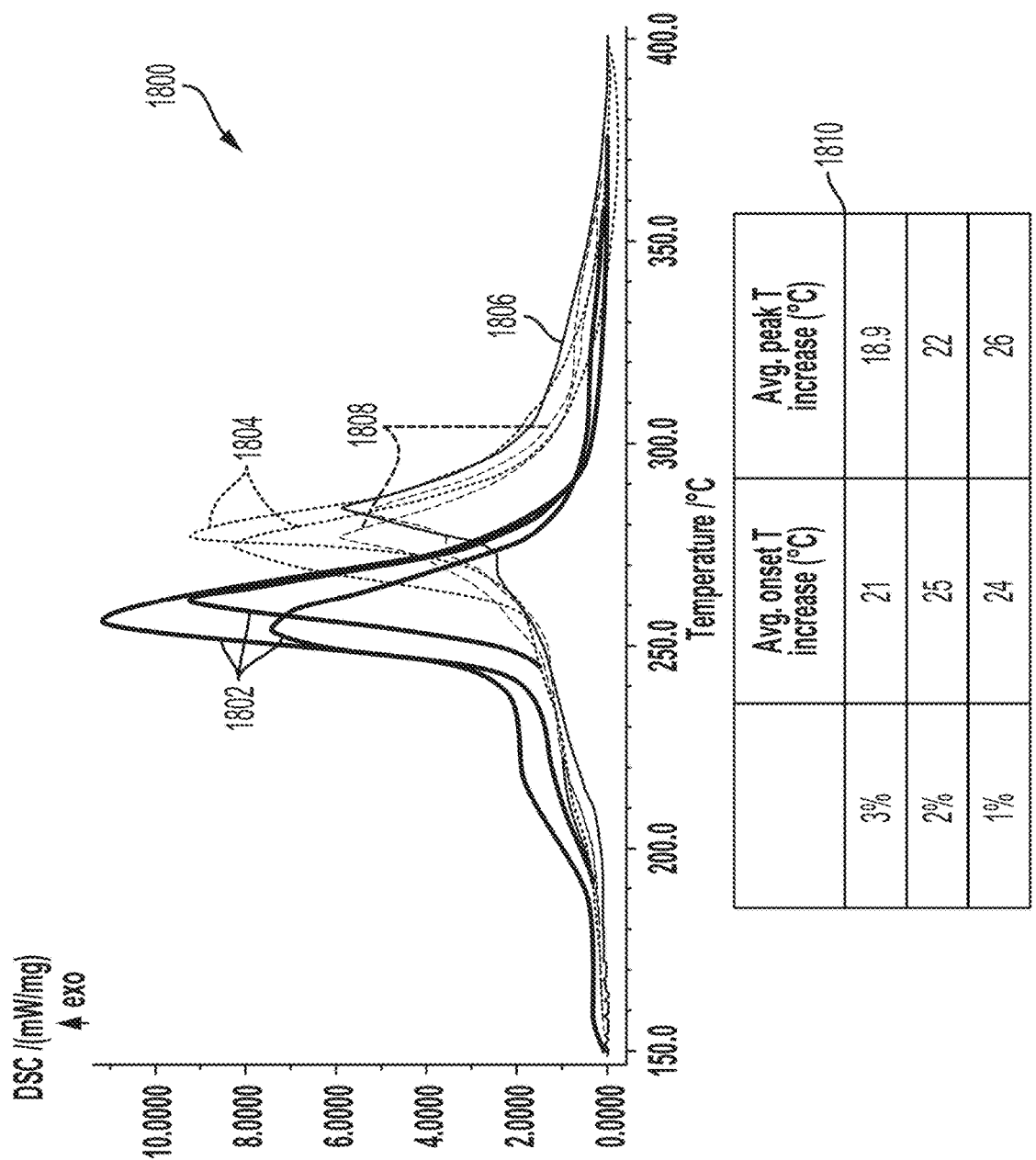
FIG. 18 shows DSC data of a NMC doped with yttrium nitrate.

FIG. 7 and FIGS. 9-18 illustrate a plurality of changes in appearance, properties, and performance of NMC622 cathode materials doped with yttrium (Y). Peaks relating to un-doped NMC622 and to NMC622 doped with Y are shown in the XRD patterns of FIG. 7, indicating larger crystallite size in the NMC622 doped with Y. A plot illustrating effects of dry and wet doping NMC622 with yttrium acetate on FCC and FDC is shown in FIG. 9, indicating that dry and wet doped NMC622 have reduced FCCs and FDCs. A plot illustrating an effect of dry doping with yttrium acetate on cycle life of NMC622 is shown in FIG. 10, indicating that dry doping fails to increase discharge capacity retention. XRD patterns comparing yttrium acetate doping methods and amounts on crystal structure of NMC622 are shown in FIG. 11, indicating larger crystallite size in doped NMC622. A plot illustrating effects of diffusion doping with yttrium nitrate on FCC and FDC is shown in FIG. 12, indicating that diffusion doping of NMC622 results in maintained FCCs and FDCs as compared to an un-doped NMC622. A plot illustrating effects of diffusion doping with yttrium nitrate on cathode material efficiencies is shown in FIG. 13, indicating increased efficiencies for doped NMC622. A plot illustrating effects of doping NMC622 with yttrium nitrate on cycle life is shown in FIG. 14, indicating increased discharge capacity retention for diffusion doped NMC622. A 20,000× magnification SEM image of un-doped NMC622 is shown in FIG. 15A. A 40,000× magnification SEM image of un-doped NMC622 is shown in FIG. 15B. A 20,000× magnification SEM image of Y diffusion doped NMC622 when a dopant salt is yttrium nitrate is shown in FIG. 15C. A 40,000× magnification SEM image of Y diffusion doped NMC622 when a dopant salt is yttrium nitrate is shown in FIG. 15D. XRD patterns illustrating an effect of doping with yttrium nitrate are shown in FIG. 16. FIG. 16 also shows a table indicating enhanced electrochemical performance in NMC622 due to diffusion doping with yttrium nitrate. Plots illustrating impedance and cyclic voltammetry of an un-doped NMC622 cathode and a 3 wt. % Y doped NMC622 cathode are shown in FIGS. 17A-17D, indicating increased lithium ion diffusion efficiency in the doped NMC622 cathode. A plot illustrating impedance of a fresh un-doped NMC622 cathode and a fresh 3 wt. % Y doped NMC622 cathode is shown in FIG. 17A. A plot illustrating impedance of an un-doped NMC622 cathode and a 3 wt. % Y doped NMC622 cathode during a $3^{rd}$ cycle at 3.9 V is shown in FIG. 17B. A plot illustrating impedance of an un-doped NMC622 cathode and a 3 wt. % Y doped NMC622 cathode during a $100^{th}$ cycle at 3.9 V is shown in FIG. 17C. Cyclic voltammograms for an un-doped NMC622 cathode and a 3 wt. % Y doped NMC622 cathode are shown in FIG. 17D. DSC data of NMC622 doped with yttrium nitrate is shown in FIG. 18, indicating higher peak heat release for NMC622 doped with Y.

Figure 8:
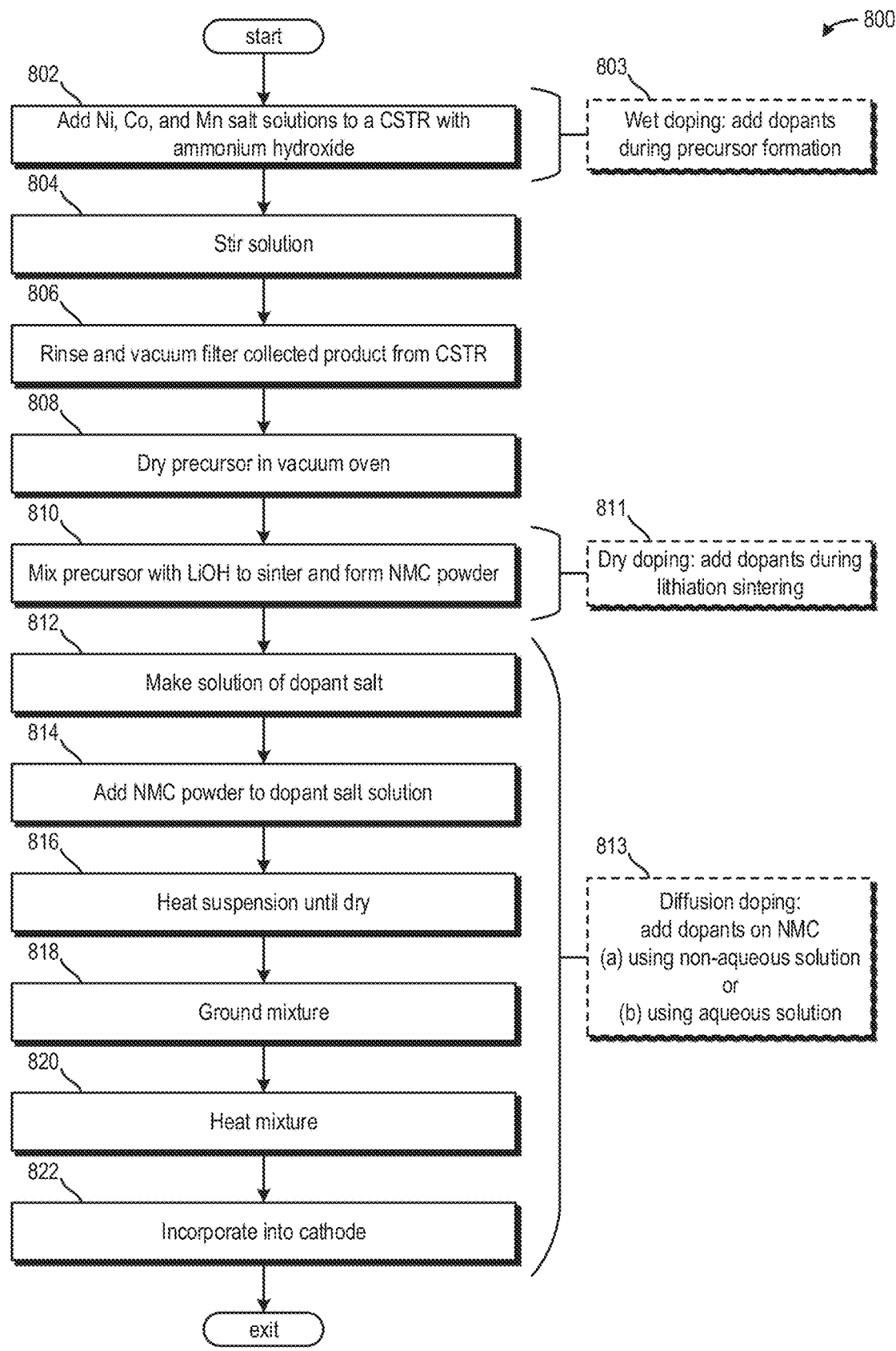
FIG. 8 shows a method for doping one or more metals into a precursor for a cathode of a Li ion battery.

A method for doping one or more transition metals and lanthanides into a NMC is shown in FIG. 8.

Figure 1:
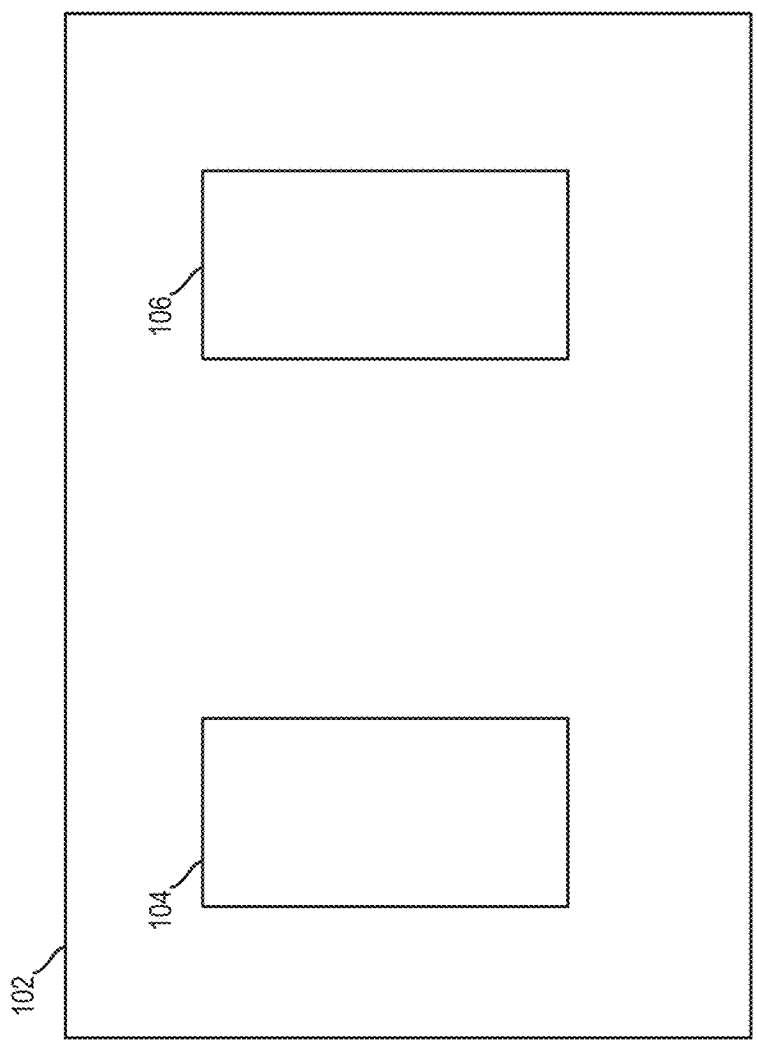
FIG. 1 shows an example of a Li ion battery having a cathode and an anode.

Turning now to FIG. 1, a battery system 100 comprising a battery capsule 102 housing a cathode 104 and an anode 106 is shown. In one example, the battery system 100 is a Li ion battery system.

During charging of the battery system 100, Li ions may flow from the cathode 104 to the anode 106. There may be one or more electrolyte solutions arranged therebetween to assist in facilitating Li ion transport between the cathode 104 and the anode 106. The cathode 104 may comprise a high amount of nickel (Ni). In one example, the cathode 104 comprises cathode materials comprising greater than or equal to 60% Ni, say, between 60 to 100% Ni. Additionally or alternatively, the cathode 104 may comprise one or more metal dopants. In some examples, the cathode 104 may comprise one or more of a transition metal or lanthanide dopant. In one example, the cathode 104 comprises one or more of strontium (Sr), barium (Ba), rubidium (Rb), cesium (Cs), zirconium (Zr), niobium (Nb), molybdenum (Mo), technetium (Tc), ruthenium (Ru), tungsten (W), platinum (Pt), copper (Cu), zinc (Zn), rhodium (Rh), yttrium (Y), scandium (Sc), titanium (Ti), chromium (Cr), manganese (Mn), cerium (Ce), samarium (Sm), neodymium (Nd), praseodymium (Pr), and lanthanum (La). In another example, the cathode 104 comprises one or more of strontium (Sr), barium (Ba), rubidium (Rb), cesium (Cs), zirconium (Zr), niobium (Nb), molybdenum (Mo), technetium (Tc), ruthenium (Ru), tungsten (W), platinum (Pt), neodymium (Nd), samarium (Sm), cerium (Ce), yttrium (Y), praseodymium (Pr), and lanthanum (La). In yet another example, the cathode 104 comprises one or more of strontium (Sr), barium (Ba), rubidium (Rb), cesium (Cs), zirconium (Zr), niobium (Nb), molybdenum (Mo), technetium (Tc), ruthenium (Ru), tungsten (W), platinum (Pt), neodymium (Nd), cerium (Ce), and yttrium (Y).

Each of the one or more metal dopants may comprise a radius larger than a radius of Ni, Mn, and Co. Said another way, the cathode may be doped with metals which are larger than Ni, Mn, and Co (e.g., greater than or equal to 60%). In some embodiments, the cathode material comprising a high Ni content may comprise between 61 to 90 wt. % Ni. In some embodiments, the cathode material comprising a high Ni content may comprise between 70 to 80 wt. % Ni. In some embodiments, the cathode material comprising a high Ni content may comprise between 72 to 78 wt. % Ni. In some examples, the cathode material comprising a high Ni content may comprise between 35 to 65 wt. % Ni. Additionally or alternatively, the cathode material comprising a high Ni content may comprise between 61 to 64 wt. % Ni. In one example, the high Ni content cathode material may comprise exactly 63 wt. % Ni. In one example, an ionic radius of each of the metal elements to be doped into the cathode 104 may be between 1.2 to 3 times larger than the ionic radius of Ni. In some embodiments, the ionic radius of each of the metal elements to be doped may be between 1.3 to 2 times larger than the ionic radius of Ni. In some embodiments, the ionic radius of each of the metal elements to be doped may be between 1.5 to 1.8 times larger than the ionic radius of Ni. In one example, the ionic radius of each of the metal elements to be doped may be exactly 1.6 times larger than the ionic radius of Ni. In additional or alternative examples, the ionic radius of each of the metal elements to be doped may be greater than 60 picometers, for example, between 60 and 220 picometers. For example, ionic radii of $Nd^{3+}$ and $Y^{3+}$ are 112 and 104 picometers, respectively, while ionic radii of $Ni^{2+}$, $Mn^{4+}$, and $Co^{3+}$ are 69, 53, and 54.5 picometers, respectively. Said another way, an atomic radius of each of the elements to be doped may be greater than 60 picometers, for example, between 60 and 220 picometers, to sufficiently enlarge a lithium pathway of a crystal structure of the cathode in order to mitigate any obstructions therein during cycling of the battery system 100. Additionally or alternatively, in some embodiments, the atomic radius of each of the elements to be doped may be between than 80 to 200 picometers. Additionally or alternatively, in some embodiments, the atomic radius of each of the elements to be doped may be between 100 to 150 picometers. Additionally or alternatively, in some embodiments, the atomic radius of each of the elements to be doped may be between 100 to 130 picometers. Additionally or alternatively, in some embodiments, the atomic radius of each of the elements to be doped may be between 100 to 115 picometers.

A doping amount of metal may be between 0.01 to 15 wt. %. In some embodiments, the doping amount of metal in the cathode material may be between 0.01 to 10 wt. %. In some embodiments, the doping amount of metal in the cathode material may be between 1 to 5 wt. %. In some embodiments, the doping amount of metal in the cathode material may be between 2 to 4 wt. %. In one example, the doping amount may be exactly equal to 3 wt. %. The dopants may be incorporated (e.g., intercalated, bonded to, etc.) into a crystal structure of the cathode 104.

By doping large elements into the cathode 104, a c-direction (e.g., the lithium pathway) of the crystal structure where Li ions insert or extract through may be increased, as shown in X-ray diffraction plot 200 of FIG. 2. By increasing the c-direction, Li ions may more readily flow from Li ion sites on the cathode 104 to Li ion sites on the anode 106 and vice versa. Additionally, doping of the metals may further include expanding a crystallite from which Li inserts and extracts. The doping may further achieve a secondary phase, where the secondary phase may be on or near to a surface of the cathode 104. In one example, the secondary phase uniformly coats surfaces of the cathode 104 and may act as a barrier to hinder undesired side reactions between electrolytes and cathode particles. In this way, the cathode 104 may realize strengthened metal oxygen bonds by doping the transition metals and/or lanthanides into the crystal structure of the cathode 104, while also minimizing side reactions.

As discussed in detail below, FIGS. 2-24 describe specific embodiments of the cathode 104. It will be appreciated that such embodiments do not limit elements as described above in reference to FIG. 1. As an example, cathodes described herein may comprise one or more dopants, wherein the one or more dopants are selected from Nd, Y, and Ce, alone or in combination. For non-limiting example purposes, FIGS. 2-6 and 19-24 detail use of Nd. For further non-limiting example purposes, FIGS. 7 and 9-18 detail use of Y.

Turning now to FIG. 2, an X-ray diffraction (XRD) plot 200 is shown. The XRD plot 200 includes a curve 202 which depicts a scattering for un-doped $LiNi_{0.6}Mn_{0.2}Co_{0.2}O_2$ (NMC622), a curve 204 which depicts a scattering for NMC622 doped with $Nd(NO_3)_3$, and a curve 206 which depicts a scattering for NMC622 doped with $NdI_3$. In one example, the curve 204 or the curve 206 may represent NMC622 material used to fabricate the cathode 104 of FIG. 1. Herein, "un-doped NMC622" refers to an NMC622 powder that is not doped with Nd or other lanthanides and metals having atomic radii greater than 100 picometers. However, the un-doped NMC may be doped with metals having atomic radii similar in size to the atomic radii of nickel. Additionally or alternatively, un-doped NMC622 may not be doped at all.

Peaks magnified by dashed box 210 correlate to a C-direction (e.g., lithium pathway), which is parallel to a direction Li ions insert or extract through the crystal structure of the cathode (e.g., cathode 104 of FIG. 1). As shown, the peaks of the curves 204 and 206, which correlate to NMC622 which has been doped with Nd, are shifted left (e.g., lower degrees) relative to the peak of the curve 202 in the magnification corresponding to the dashed box 210. The peaks of the curves 204 and 206 being shifted left may indicate that the C-direction is increasing. As described above, an increased c-direction may decrease obstruction of the lithium pathway and prolong a cycle life of the cathode material.

Peaks magnified by dashed box 220 correlate to a crystallite size. As described above, the metals are doped into the crystal structure of the cathode. The peaks of the curves 204 and 206 are shifted left relative to the peak of the curve 202 in the magnification corresponding to the dashed box 220. The peaks of the curves 204 and 206 being shifted left may indicate that the crystallite size is expanding.

Peaks of the curves 204 and 206 within the dashed box 230 correlate to a secondary phase forming during the doping process of Nd into NMC622. Secondary phase formation may be further evidenced by corresponding peaks missing from the curve 202.

Thus, a combination of the c-direction increasing, the crystallite size increasing, and the secondary phase forming may lead to an increased cycle life, decreasing likelihood of degradation of a cathode material, and improved charge and discharge operation. The increasing space in c-direction enlarges the lithium pathway during the charge and discharge process, which decreases the resistance and increases the efficiency during the process. The decreased resistance may result in a more stable cathode material with longer cycle life. The secondary phase formed at a surface of the cathode material may prevent and/or limit the undesirable side reactions between cathode material and electrolyte especially at high voltage. The elimination of these side reactions may lead to less degradation at the surface of the cathode material and a longer cycle life.

Turning now to FIG. 3, a differential scanning calorimetry (DSC) plot 300 is shown which illustrates heat released by un-doped $LiNi_{0.6}Mn_{0.2}Co_{0.2}O_2$ (NMC622) and NMC622 doped with Nd. The un-doped NMC622 is shown by solid curves 302. The NMC622 doped with Nd is shown by dashed curves 304. Temperature is shown on the x-axis of the plot 300 and specific energy is shown on the y-axis in mW/mg. Multiple trials of each of the un-doped NMC622 (as shown in curves 302) and the doped NMC622 (as shown in curve 304) are depicted to indicate reproducibility, precision and accuracy of the DSC.

As shown, the curves 302 reach a peak heat release between 245 and 266° C. and the curves 304 reach a peak heat release between 257 to 276° C. The peak heat release may be indicative of a strength of bonded oxygen atoms. For example, a cathode material sample with stronger oxygen bonds may release oxygen at higher temperature compared to a cathode material with weaker oxygen bonds. As such, the un-doped NMC622 may begin to release oxygen atoms before the doped NMC622. By releasing oxygen atoms later, the doped NMC622 may afford the cathode an improved thermal stability. For example, during an overheating event, the doped NMC622 may decrease a likelihood of thermal run away by preventing oxygen and heat release.

Turning now to FIGS. 4A, 4B, 4C, and 4D, scanning electron microscope (SEM) images 400, 425, 450, and 475, respectively, are shown. Specifically, SEM image 425 of FIG. 4B is a magnification of the SEM image 400 of FIG. 4A. Likewise, SEM image 475 of FIG. 4D is a magnification of the SEM image 450 of FIG. 4C. The SEM images 400 and 425 are SEM images of $LiNi_{0.6}Mn_{0.2}Co_{0.2}O_2$ (NMC622) doped with Nd. Conversely, the SEM images 450 and 475 are SEM images of un-doped NMC622.

The SEM images 400 and 425 depict a formation of a secondary phase of Nd on a surface of a cathode particle. SEM images 450 and 475 depict a similar area of a cathode particle, wherein there is no secondary phase formation. Comparing the SEM images 400 and 450, the SEM image 400 illustrates a uniform coating of the secondary phase onto the cathode particle compared to no coating on the cathode particle of SEM image 450. The uniform coating may function as a barrier hindering and/or preventing side reactions from occurring between the cathode particle and electrolytes coming into contact therewith. As such, the cathode particle may not degrade due to side reactions especially at high voltage where the cathode particle is more reactive.

Turning now to FIG. 5, a plot 500 illustrating discharge capacity retention percentages for doped and un-doped $LiNi_{0.6}Mn_{0.2}Co_{0.2}O_2$ (NMC622) cathodes is shown. A number of cycles are shown along an x-axis and increase from a left to a right side of the figure. The plot 500 includes curves 510 which illustrate discharge capacity retention for un-doped NMC622. The curves 510 are shown in large dashes. The plot 500 further includes curves 520 and 530, wherein the plots illustrate discharge capacity retention for NMC622 doped with Nd. In one example, curves 520 indicate NMC622 doped with $Nd(NO_3)_3$ and curves 530 indicate NMC622 doped with $NdI_3$. Curves 520 are shown in small dashes, where the small dashes are smaller than the large dashes. Curves 530 are shown as a solid line. As shown by the trend of the curves 510, 520, and 530, un-doped NMC622 experiences a more rapid decay in discharge capacity retention such that the discharge capacity retention is as low as about 85% after 120 cycles. Conversely, the discharge capacity retention of the doped NMC622 curves 520 and 530 is about 95% or more. Such improvement in discharge capacity retention may be attributed to the effects of the dopant described above, including the increased c-direction, increased crystallite size, and secondary phase formation. Duplicates of the curves are shown to demonstrate the repeatability of the results.

Turning now to FIG. 6, a table 600 illustrating peak onset and peak max temperatures in ° C. is shown. Rows 602, 604, and 606 each correspond to un-doped $LiNi_{0.6}Mn_{0.2}Co_{0.2}O_2$ (NMC622). Rows 608 and 610 each correspond to NMC622 doped with 3 wt. % Nd.

Rows 602, 604, and 606 show un-doped NMC622 comprising a peak onset temperature within a range of 240 to 249° C. and a peak max temperature between 254 to 261.5° C. Rows 608 and 610 show doped NMC622 comprising a peak onset temperature within a range of 260 to 272.5° C. and a peak max temperature between 275 to 277.5° C. As such, the peak onset and peak max temperature ranges of doped NMC622 are greater than the peak onset and peak max temperature ranges, thereby indicating increased thermal stability of the cathode. In some embodiments, peak onset temperature may be greater than 250° C. and the peak max temperature may be greater than 270° C. for doped NMC622.

Turning now to FIG. 19, a plot 1900 comparing the rate performances of 93450 format cells comprising un-doped $LiNi_{0.6}Mn_{0.2}Co_{0.2}O_2$ (NMC622; as shown in plots 1922, 1942, 1962, and 1982) or 3 wt. % Nd doped NMC622 (as shown in plots 1924, 1944, 1964, and 1984). The cells were operated at 1C, 2C, 3C, and 5C (as shown in charts 1920, 1940, 1960, and 1980, respectively). Tests generating the plots 1922, 1924, 1942, 1944, 1962, 1964, 1982, and 1984 were conducted at a temperature of 45° C. A presence of inert Nd results in a lowered capacity at 1C and 2C rates in 3 wt. % Nd doped NMC622 (as shown in plots 1924 and 1944) as compared to un-doped NMC622 (as shown in plots 1922 and 1942). However, expanded lithium pathways (e.g., an increase along a C-direction) in 3 wt. % Nd doped NMC622 lattices counteracted a tendency to drop in capacity at higher rates, such as 3C and above. As a result, capacities of 3 wt. % Nd doped NMC622 (as shown in plots 1964 and 1984) were similar to capacities of un-doped NMC622 (as shown in plots 1962 and 1982) in cells operating at 3C and 5C. As described above, each test depicted in plot 1900 were conducted with a 93450 format cell. Use of the 93450 format cell with a capacity of 2 Ah, being a larger format cell than, for example, a half-coin cell with a capacity of 2 mAh, illustrates the scaling capabilities of Nd doped cathode materials, such as 3 wt. % Nd doped NMC622.

Turning now to FIG. 20, a plot 2000 depicting state of charge (SOC) benefits of a battery comprising 3 wt. % Nd doped $LiNi_{0.6}Mn_{0.2}Co_{0.2}O_2$ (NMC622; as shown by curve 2004) as compared to a battery comprising un-doped NMC622 (as shown by curve 2002) is shown. Tests generating the curves 2002 and 2004 were conducted at a temperature of 45° C. The curve 2004 illustrates a change in a SOC during a plurality of cycle lives of the battery with 3 wt. % Nd doped NMC622. The curve 2002 illustrates a steeper change in the SOC during a plurality of cycle lives of the battery with un-doped NMC622. Thus the curve 2004 as compared to the curve 2002 indicates use of 3 wt. % Nd doped NMC622 maintained a higher SOC following 200 cycles. Further, the higher SOC indicates an increased cycle life performance of the battery with 3 wt. % Nd doped NMC622 as compared to the battery with un-doped NMC622.

Turning now to FIG. 21, a plot 2100 depicting direct current resistance (DCR) relative to an initial DCR of batteries comprising un-doped $LiNi_{0.6}Mn_{0.2}Co_{0.2}O_2$ (NMC622; as shown by curves 2102) or 3 wt. % Nd doped NMC622 (as shown by curves 2104) is shown. Tests generating the curves 2102 and 2104 were conducted at a temperature of 45° C. The curves 2104 illustrate a change of relative DCR during a plurality of cycle lives of the batteries with 3 wt. % Nd doped NMC622. The curves 2102 illustrate a steeper change of relative DCR in the batteries with un-doped NMC622. Thus the curves 2104 as compared to the curves 2102 indicate use of 3 wt. % Nd doped NMC622 maintained a lower relative DCR following 200 cycles.

Turning now to FIG. 22, a plot 2200 depicting average charge voltage of batteries comprising un-doped $LiNi_{0.6}Mn_{0.2}Co_{0.2}O_2$ (NMC622; as shown by curves 2202) or 3 wt. % Nd doped NMC622 (as shown by curves 2204) is shown. Tests generating the curves 2202 and 2204 were conducted at a temperature of 45° C. The curves 2204 illustrate a change of average charge voltage during a plurality of cycle lives of the batteries with 3 wt. % Nd doped NMC622. The curves 2202 illustrate a steeper change of average charge voltage in the batteries with un-doped NMC622. Thus the curves 2204 as compared to the curves 2202 indicate use of 3 wt. % Nd doped NMC622 maintained a lower average charge voltage following 300 cycles. The average charge voltage being stabilized and lower in the batteries with the 3 wt. % Nd doped NMC622 indicate structural stabilization due to a presence of Nd dopant.

Turning now to FIG. 23, a plot 2300 depicting average discharge voltage of batteries comprising un-doped $LiNi_{0.6}Mn_{0.2}Co_{0.2}O_2$ (NMC622; as shown by curves 2302) or 3 wt. % Nd doped NMC622 (as shown by curves 2304) is shown. Tests generating the curves 2302 and 2304 were conducted at a temperature of 45° C. The curves 2304 illustrate a change of average discharge voltage during a plurality of cycle lives of the batteries with 3 wt. % Nd doped NMC622. The curves 2302 illustrate a steeper change of average discharge voltage in the batteries with un-doped NMC622. Thus the curves 2304 as compared to the curves 2302 indicate use of 3 wt. % Nd doped NMC622 maintained a higher average discharge voltage over 1000 cycles. The average discharge voltage being stabilized and higher in the batteries with the 3 wt. % Nd doped NMC622 indicate structural stabilization due to a presence of Nd dopant.

Turning now to FIG. 24, an energy dispersive spectroscopy (EDS) mapping 2400 of Nd doped $LiNi_{0.6}Mn_{0.2}Co_{0.2}O_2$ (NMC622) powder is shown. The EDS mapping 2400 illustrates uniform dispersion of smaller Nd particles layered and/or dusted on larger NMC622 particles. As depicted by the EDS mapping 2400, the Nd particles comprise a lighter shade and the NMC622 particles comprise a darker shade.

Figure 7:
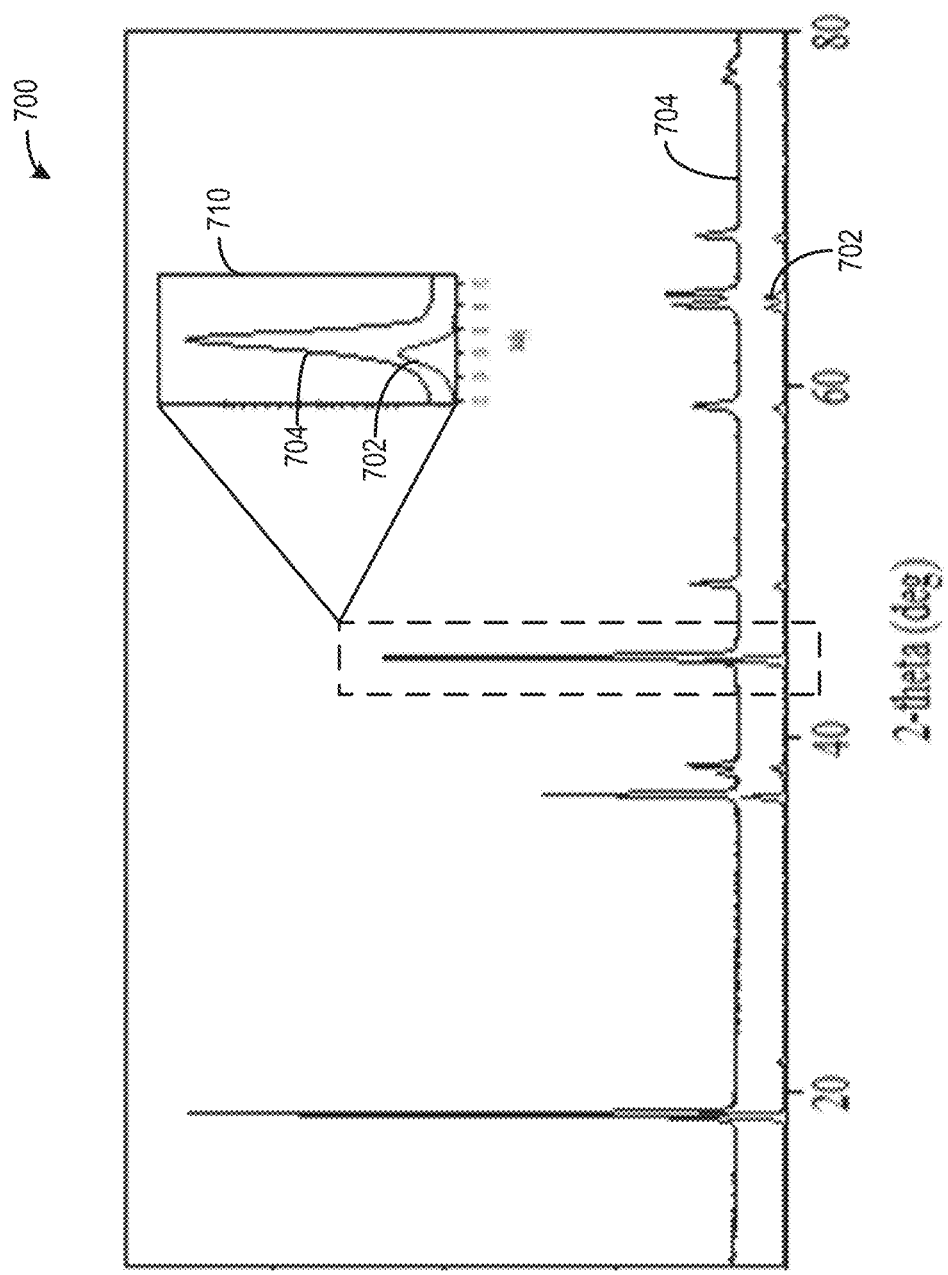
FIG. 7 shows XRD patterns of an un-doped NMC and a NMC doped with Y.

Turning now to FIG. 7, an X-ray diffraction (XRD) plot 700 illustrating doped $LiNi_{0.6}Mn_{0.2}Co_{0.2}O_2$ (NMC622; as shown in curve 702) and un-doped NMC622 (as shown in curve 704) is shown. The dopant salt used in the doped NMC622 is an yttrium (Y) based dopant salt. In one example, as shown in magnification 710, a peak of the curve 702 is shifted to the left of a peak of the curve 704, which indicates that a crystallite size of the doped NMC622 is larger than that of the un-doped NMC622.

Turning now to FIG. 11, an X-ray diffraction (XRD) plot 1100 with the curves 702 and 704 from FIG. 7 alongside curves 1102 and 1104, which correspond to doped $LiNi_{0.6}Mn_{0.2}Co_{0.2}O_2$ (NMC622), is shown. The dopant salt used to dope NMC622 is yttrium acetate. Curve 702 represents NMC622 wet doped with 3 wt. % Y. Curve 1104 represents NMC622 dry doped with 3 wt. % Y. Curve 1104 represents NMC622 dry doped with 5 wt. % Y. Magnifications 1110 and 1112 show peaks of doped NMC622 are shifted to the left of peaks of un-doped NMC622, indicating that a crystallite size of doped NMC622 is larger than that of un-doped NMC622. An SI standard (peaks shown in dashed boxes 1116) was used to align peaks from each sample. A magnification 1114 of peak alignment with the SI standard is shown. There are observable secondary phase peaks shown in box 1118 in doped NMC622 (as shown in curves 702, 1102, and 1104). Possible secondary phases that may be represented by the peaks in box 1118 are presented.

Turning now to FIG. 16, an X-ray diffraction (XRD) plot 1600 with a curve 1602 of un-doped $LiNi_{0.6}Mn_{0.2}Co_{0.2}O_2$ (NMC622), a curve 1604 of 1 wt. % Y dry doped NMC622, a curve 1606 of 3 wt. % Y dry doped NMC622, and a curve 1608 of 3 wt. % Y dry doped NMC622 is shown. A magnification 1610 shows that 3 wt. % Y doped NMC622 peaks are shifted left. Doped NMC622 show secondary phases (as shown in box 1612). Chart 1614 shows lattice parameter c which indicates the doping of Y into NMC622. The chart 1614 also shows that Y doping can reduce a Li/Ni mixing ratio, which benefits electrochemical performance.

Turning now to FIG. 18, a differential scanning calorimetry (DSC) plot 1800 illustrating heat release by un-doped $LiNi_{0.6}Mn_{0.2}Co_{0.2}O_2$ (NMC622) and NMC622 doped with Y is shown. The un-doped NMC622 is shown by curves 1802. NMC622 doped with 3 wt. % Y is shown by curves 1804. NMC622 doped with 2 wt. % Y is shown by curve 1806. NMC622 doped with 1 wt. % Y is shown by curves 1808. Temperature is shown on an x-axis of the plot 1800 and specific energy released is shown on a y-axis in mW/mg. Multiple trials of each of the un-doped NMC622 and the NMC622 doped with Y are depicted to indicate precision and accuracy of the DSC. Chart 1810 shows average onset temperature increase (° C.) and average peak temperature increase (° C.) of the NMC622 doped with Y. The NMC622 doped with 3 wt. % Y has an average onset temperature increase of 21° C. and an average peak temperature increase of 18.9° C. The NMC622 doped with 2 wt. % Y has an average onset temperature increase of 25° C. and an average peak temperature increase of 22° C. The NMC622 doped with 1 wt. % Y has an average onset temperature increase of 24° C. and an average peak temperature increase of 26° C.

Turning now to FIGS. 15A, 15B, 15C, and 15D, scanning electron microscope (SEM) images 1500, 1525, 1550, and 1575, respectively, are shown. The SEM images 1500 and 1525 depict un-doped $LiNi_{0.6}Mn_{0.2}Co_{0.2}O_2$ (NMC622). The SEM images 1550 and 1575 are depict a 3 wt. % Y diffusion doped NMC622. Energy dispersive X-ray spectroscopy analysis indicates that the atomic percentages of the particles shown in the SEM images 1550 and 1575 are 36.15% O, 33.72% C, 17.73% Ni, 5.88% Co, 5.62% Mn, 0.67% Y, and 0.24% S. As shown in the SEM images 1550 and 1575, the primary particle surface of the 3 wt. % Y diffusion doped NMC622 is covered by nanoscale particles, which may be the secondary phases shown in XRD patterns. These nanoparticles may further result in improved cycle and DSC performances.

Turning now to FIG. 10, a plot 1000 illustrating discharge capacity retention percentages for Y doped and un-doped $LiNi_{0.6}Mn_{0.2}Co_{0.2}O_2$ (NMC622) cathodes is shown. Y doped NMC622 was doped with yttrium acetate. The plot 1000 includes curves 1002 which illustrate discharge capacity retention for un-doped NMC622. Curves 1004 illustrate discharge capacity retention for un-doped NMC622 from a vendor. The plot 1000 further includes curves 1006 and 1008, wherein the plots illustrate discharge capacity retention for NMC622 doped with Y. In one example, curves 1006 indicate 3 wt. % Y dry doped NMC622 and curves 1008 indicate 5 wt. % Y dry doped NMC622. As shown by curves 1006, 3 wt. % Y dry doping does not decrease cycle life. As shown by curves 1008, 5 wt. % Y dry doping leads to drastic cycle life deterioration. Duplicates of the curves are shown to demonstrate the repeatability of the results.

Turning now to FIG. 14, a plot 1400 depicting discharge capacity retention percentages for Y doped $LiNi_{0.6}Mn_{0.2}Co_{0.2}O_2$ (NMC622) is shown, in which the dopant salt was yttrium nitrate, and un-doped NMC622. The plot 1400 includes curves 1402 which illustrate discharge capacity retention for un-doped NMC622. The plot 1000 further includes curves 1404, 1406, 1408, and 1410, wherein the plots illustrate discharge capacity retention for Y doped NMC622. In one example, curves 1404 indicate 1 wt. % Y wet doped NMC622, curves 1406 indicate 3 wt. % Y dry doped NMC622, curves 1408 indicate 3 wt. % Y wet doped NMC622, and curves 1410 indicate 3 wt. % Y diffusion doped NMC622. As shown by curves 1404, 1406, 1408, and 1410, 1 wt. % and 3 wt. % Y dry doping does not decrease cycle life. However, the 3 wt. % Y diffusion doping increases the discharge capacity retention by 4 wt. %.

Turning now to FIG. 9, a plot 900 is shown, including charts 920 and 960. Chart 920 shows first charge capacities (FCCs) for un-doped $LiNi_{0.6}Mn_{0.2}Co_{0.2}O_2$ (NMC622; as shown in plot 928) and NMC622 doped with Y (as shown in plots 922, 924, and 926), where yttrium acetate is used as a dopant salt. The FCC for 3 wt. % Y dry doped NMC622 is 196.803 mAh/g (as shown in plot 922). The FCC for 3 wt. % Y wet doped NMC622 is 191.716 mAh/g (as shown in plot 924). The FCC for 5 wt. % Y dry doped NMC622 is 169.692 mAh/g (as shown in plot 926). The FCC for un-doped NMC622 is 202.488 mAh/g (as shown in plot 928).

Chart 960 shows first discharge capacities (FDCs) for un-doped NMC622 (as shown in plot 968) and NMC622 doped with Y (as shown in plots 962, 964, and 966), where yttrium acetate is used as a dopant salt. The FDC for 3 wt. % Y dry doped NMC622 is 167.351 mAh/g (as shown in plot 962). The FDC for 3 wt. % Y wet doped NMC622 is 166.602 mAh/g (as shown in plot 964). The FDC for 5 wt. % Y dry doped NMC622 is 150.811 mAh/g (as shown in plot 966). The FDC for un-doped NMC622 is 174.662 mAh/g (as shown in plot 968).

Charts 920 and 960 indicate that a dopant loading of 3 wt. % Y may maintain FCC and FDC in NMC622 better than an increased dopant loading of 5 wt. % Y.

Turning now to FIG. 12, a plot 1200 is shown, including charts 1220 and 1260. Chart 1220 shows first charge capacities (FCCs) for un-doped $LiNi_{0.6}Mn_{0.2}Co_{0.2}O_2$ (NMC622; as shown in plot 1232) and NMC622 doped with Y (as shown in plots 1222, 1224, 1226, 1228, and 1230), where yttrium nitrate is used as a dopant salt. The FCC for 1 wt. % Y dry doped NMC622 is 196.4 mAh/g (as shown in plot 1222). The FCC for 3 wt. % Y diffusion doped NMC622 is 197.4 to 202.3 mAh/g (two trials; as shown in plots 1224 and 1226). The FCC for 3 wt. % Y dry doped NMC622 is 189.8 mAh/g (as shown in plot 1228). The FCC for 3 wt. % Y wet doped NMC622 is 190.7 mAh/g (as shown in plot 1230). The FCC for un-doped NMC622 is 202.5 mAh/g (as shown in plot 1232).

Chart 1260 shows first discharge capacities (FDCs) for un-doped NMC622 (as shown in plot 1262) and NMC622 doped with Y (as shown in plots 1262, 1264, 1266, 1268, and 1270), where yttrium nitrate is used as a dopant salt. The FDC for 1 wt. % Y dry doped NMC622 is 171.3 mAh/g (as shown in plot 1262). The FDC for 3 wt. % Y diffusion doped NMC622 is 177.4 to 182.0 mAh/g (two trials; as shown in plots 1264 and 1266). The FDC for 3 wt. % Y dry doped NMC622 is 166.1 mAh/g (as shown in plot 1268). The FDC for 3 wt. % Y wet doped NMC622 is 167.5 mAh/g (as shown in plot 1270). The FDC for un-doped NMC622 is 174.7 mAh/g (as shown in plot 1272).

Charts 1220 and 1260 indicate that Y diffusion doping may maintain FCC and FDC in NMC622 better than Y dry and/or wet doping. Further, plots 1224, 1226, 1264, and 1266, each representing 3 wt. % Y diffusion doped NMC, demonstrate that trials may be repeatable.

Turning now to FIG. 13, a plot 1300 is shown, illustrating efficiencies of un-doped $LiNi_{0.6}Mn_{0.2}Co_{0.2}O_2$ (NMC622; as shown in plot 1312) and NMC622 doped with Y (as shown in plots 1302, 1304, 1306, 1308, and 1310), where yttrium nitrate is used as a dopant salt. The efficiency of 1 wt. % Y dry doped NMC622 is 0.87 (as shown in plot 1302). The efficiency of 3 wt. % Y diffusion doped NMC622 is 0.90 (two trials; as shown in plots 1304 and 1306). The efficiency of 3 wt. % Y dry doped NMC622 is 0.88 (as shown in plot 1308). The efficiency of 3 wt. % Y wet doped NMC622 is 0.88 (as shown in plot 1310). The efficiency of un-doped NMC622 is 0.86 (as shown in plot 1312).

Plot 1300 indicates that doped NMC622 cathodes may have increased efficiency over un-doped NMC622 cathodes. Plot 1300 further indicates that Y diffusion doping may increase the efficiency of NMC622 cathodes better than Y dry and/or wet doping. Furthermore, plots 1304 and 1306, each representing 3 wt. % Y diffusion doped NMC622, demonstrate that trials may be repeatable.

Turning now to FIGS. 17A, 17B, 17C, and 17D, impedance and cyclic voltammograms of 3 wt. % Y doped $LiNi_{0.6}Mn_{0.2}Co_{0.2}O_2$ (NMC622) cathodes and un-doped NMC622 cathodes are shown. FIG. 17A shows plot 1700, which depicts curves 1702 and 1704. Curve 1702 represents an impedance of a fresh Y doped NMC622 cathode and curve 1704 represents a fresh un-doped NMC622 cathode, where each of the Y doped NMC622 cathode and the un-doped NMC622 cathode is at open-circuit voltage. Herein, "fresh" may refer to a physical, electrochemical, and/or morphological state of a cathode prior to cycling. FIG. 17B shows plot 1725 which depicts curves 1728 and 1730. Curve 1728 represents an impedance of a Y doped NMC622 cathode during a $3^{rd}$ cycle at 3.9 V and curve 1730 represents a un-doped NMC622 cathode during a $3^{rd}$ cycle at 3.9 V. FIG. 17C shows plot 1750 which depicts curves 1752 and 1754. Curve 1752 represents an impedance of a Y doped NMC622 cathode during a $100^{th}$ cycle at 3.9 V and curve 1754 represents an un-doped NMC622 cathode during a $100^{th}$ cycle at 3.9 V. FIG. 17D shows plot 1775 which depicts cyclic voltammograms 1778 and 1780. Cyclic voltammogram 1778 represents a Y doped NMC622 cathode and cyclic voltammogram 1780 represents an un-doped NMC622 cathode. Plots 1725, 1750, and 1775 indicate that each of the Y doped and un-doped NMC622 cathodes have similar impedance before charging. As shown in plot 1750, the Y doped NMC622 cathode shows significant increase in Li ion diffusion efficiency at the $3^{rd}$ cycle. Further, plot 1775 indicates that Y doping of NMC cathodes does not affect reversible charge/discharge. Furthermore, plots 1725, 1750, and 1775 indicate that Y doping of NMC cathodes shows smaller solid-electrolyte interface and charge transfer resistances.

Turning now to FIG. 8, a method 800 for doping one or more metals into a high nickel cathode material (e.g., NMC) is shown. However, it will be appreciated that the method 800 may be used to dope transition metals and/or lanthanides into other high nickel cathode materials. For example, the method 800 may be used to dope one or more transition metals and lanthanides into nickel, cobalt, and aluminum (NCA), $LiCoO_2$, $LiNiMnO_2$, and $LiNiCoO_2$. Additionally or alternatively, the one or more transition metals and lanthanides which may be doped into the high nickel cathode material may include but are not limited to copper (Cu), zinc (Zn), rhodium (Rh), yttrium (Y), scandium (Sc), titanium (Ti), zirconium (Zr), niobium (Nb), molybdenum (Mo), chromium (Cr), manganese (Mn), cerium (Ce), samarium (Sm), neodymium (Nd), praseodymium (Pr), and lanthanum (La). In one example, the method 800 dopes Cu, Y, Nd, and Mn. For example, n number of dopant salts, the dopant salts selected from water-soluble salts of copper (Cu), zinc (Zn), rhodium (Rh), yttrium (Y), scandium (Sc), titanium (Ti), zirconium (Zr), niobium (Nb), molybdenum (Mo), chromium (Cr), manganese (Mn), cerium (Ce), samarium (Sm), neodymium (Nd), praseodymium (Pr), or lanthanum (La), may be added to water to form a solution configured to mix with a NMC powder, wherein water and the dopant salts are the only compounds present in the solution to be mixed with the NMC powder.

The method 800 begins at 802, where the method may include adding Ni, Co, and Mn salt solutions to a continuous stirred tank reactor (CSTR) with ammonium hydroxide. In one example, the Ni salt is nickel sulfate ($NiSO_4$), the Mn salt is manganese sulfate ($MnSO_4$), and the Co salt is cobalt sulfate ($CoSO_4$). Additionally or alternatively, in some embodiments, the Mn salt concentration may be in a range of 1 to 5 M. Additionally or alternatively, in some embodiments, the Mn salt concentration may be in a range of 1 to 3 M. In one example, the Mn salt concentration may be exactly 2 M. Ratios of the salts added to the CSTR may be based on a desired final composition of the cathode material. As such, for greater than 60% Ni content in the cathode material, an amount of Ni salt added to the CSTR may be at least twice that of amounts of Co and/or Mn salt added. It will be appreciated that other ratios of the salts may be realized without departing from the scope of the present disclosure. The salts may be mixed into a solution of ammonium hydroxide ($NH_4OH$) within the CSTR. The solution of $NH_4OH$ may be between 1 and 10 N. In some embodiments, the solution of $NH_4OH$ may be between 3 and 7 N. The solution of $NH_4OH$ may be exactly 6 N, in one example. However, the solution of $NH_4OH$ may comprise other concentrations without departing from the scope of the present disclosure.

In some examples, 802 may be considered as a wet doping step, as indicated by dashed box 803. For example, dopants may be added during the precursor formation of NMC.

At 804, the method 800 may include stirring the solution. Stirring the solution may include heating the solution to promote reaction. For example, the solution may be heated above room temperature (e.g., 20-25° C.). In some embodiments, the solution may be heated between 30 and 150° C. In some embodiments, the solution may be heated between 40 and 70° C. In one example, the solution may be heated to and held at 60° C. The stirring may be at different intensities, say, between 100 to 1000 RPM. In some example, the stirring may be between 400 to 800 RPM. In some examples, additionally or alternatively, the stirring is between 650 to 750 RPM. In one example, the stirring conditions include stirring the salt mixture at 700 RPM at 60° C. with 150 minutes residence time. It will be appreciated by those of ordinary skill in the art that one or more of the RPM, temperature, and time may be adjusted without departing from the scope of the present disclosure. For example, the solution may be held at room temperature and stirred at 700 RPM with at least 90 minutes residence time, say between 90 and 450 minutes residence time. In one example, the solution may be held at room temperature and stirred at 700 RPM for exactly 150 minutes residence time. Similarly, the solution may not be stirred and may be heated between 60 to 90° C. for at least 90 minutes, say between 90 and 450 minutes. In one example, the solution may not be stirred and may be heated between 60 to 90° C. for exactly 150 minutes. A solid may form.

At 806, the method may include rinsing and vacuum filtering collected product from the CSTR. The product (e.g., the solid formed) may be separated from the remaining liquid in the CSTR via a product collecting tube or the like. The solid may be vacuum filtered, which may include rinsing and/or washing the solid with deionized (DI) water. The rinsing may occur up to a pH of less than 9, say, between 7 to 9. In some examples, additionally or alternatively, the pH may be between 7.5 to 7.9. In some examples, additionally or alternatively, the pH may be between 7 and 8. In some examples, additionally or alternatively, the pH may be between 7 and 7.5. In one example, the pH may be exactly 7. In some examples, additionally or alternatively, the pH may be between 7 and 9. In one example, the pH may be exactly 8. This may form a precursor.

At 808, the method may include drying the precursor in a vacuum oven. Thus, the vacuum oven may include a relatively high temperature and low pressure, which may enable water to evaporate off of the precursor without excessive heating. For example, the vacuum oven may be set to a temperature between 60 to 90° C. for an amount of time. In one example, the amount of time is greater than one hour. In another example, the amount of time is greater than eight hours. It will be appreciated that the amount of time may be adjusted without departing from the scope of the present disclosure. For example, the amount of time may be one or more weeks, say, between one to ten weeks.

At 810, the method may include mixing the precursor with lithium hydroxide (LiOH) for sintering. It will be appreciated that other lithium salts may be used without departing from the scope of the present disclosure. For example, $Li_2CO_3$ may be used. The sintering process may form the NMC powder. The mixing may include mixing the precursor with an excess of LiOH. In one example, the excess LiOH is in excess of 1.05 times stoichiometric. In another example, the excess may be 1.1 times stoichiometric, 1.25 times stoichiometric, 2 times stoichiometric, and the like. The mixing may include combining LiOH and the precursor in solid phases to form a solid mixture. The solid mixture may then be heated to between 100 to 1000° C. In one example, the mixture is heated to exactly 850° C. Additionally or alternatively, the mixture may be heated for between 1 to 24 hours. In one example, the mixture may be heated for exactly 12 hours. Herein the sintered material may be referred to as the NMC powder. Since a Li salt (e.g., LiOH) may be mixed in prior to a doping process, as described below, the method 800 also may avoid possible undesired reactions between Li salts and a sintering process, as described below, to dope metals into the NMC powder.

In some examples, step 810 may be considered a dry doping step, as indicated by dashed box 811. In such examples, dopants may be added during the lithiation sintering in the formation of the NMC powder.

At 812, the method may include forming a solution of one or more dopant salts. It should be appreciated that steps 812-822 may be understood to be diffusion doping steps, as indicated by dashed box 813, where the dopant(s) are added to the NMC. In some examples, the diffusing doping may occur through use with a non-aqueous solution. In other examples, the dopants may be added using an aqueous solution.

In one example, only one dopant salt may be doped into the NMC powder at a given time. In another example, multiple dopant salts may be used to dope multiple, different metals into the NMC powder. The description herein may relate to doping Nd into the NMC powder. A solution of Nd dopant salt may be prepared by mixing a water-soluble form of the Nd dopant salt, such as $Nd(NO_3)_3$ or $NdI_3$, into water. As described above, water may be avoided for doping purposes due to many dopant salts being relatively insoluble in water. Additionally, water may be avoided due to Li leeching out of the NMC powder when the NMC powder is introduced to water. This will be discussed in greater detail below. However, while water may present the challenges described above, water is cheaper than organic solvents typically used and produces zero waste. Furthermore, water is less toxic than many of the organic solvents used in previous examples of doping into the NMC powder or similar cathode material. It will be appreciated that solvents other than water may be used, such as isopropanol (IPA), ethanol, N-methyl-2-pyrrolidone (NMP), and acetone.

The Nd dopant salt may be fully dissolved in DI water to 0.01 to 15 wt. % of the NMC powder. The wt. % of Nd dopant salt may be less than 5 wt. %, for example, between 0.01 to 5 wt. %. In some examples, the wt. % of Nd dopant salt may be less than 3 wt. %, for example between 0.01 to 3 wt. %. In some examples, the wt. % of Nd dopant salt may be less than 1 wt. %, for example, between 0.01 to 1 wt. %. In one example, the Nd dopant salt is dissolved in DI water to 3 wt. % of the NMC powder. In one example, the Nd dopant salt may be stirred and/or heated following addition to the DI water to assist in dissolution. Alternatively, the mixture of Nd dopant salt and water may not be stirred and/or heated.

At 814, the method may include adding the NMC powder to the dopant salt solution. During this step, Li may leech out of the NMC powder, which, as is known by those in the art, may decrease an energy output of a final product cathode. The dopant salt solution comprising the NMC powder may be stirred.

At 816, the method may include heating the NMC powder and dopant salt solution until dry. In some examples, the heating the NMC powder and dopant salt solution proceeds gradually until the DI water evaporates. In one example, the dopant salt solution with the NMC may be heated until the DI water may be considered completely evaporated (e.g., less than 1% water remains). Additionally or alternatively, the NMC powder may be suspended in the dopant salt solution, where the Nd may be uniformly deposited at the surface of the NMC powder as an amount of DI water decreases. In some examples, heating the NMC powder and dopant salt solution may occur immediately following and/or subsequent to the adding the NMC powder to the dopant salt solution.

At 818, the method may include grinding the mixture, where the grinding the mixture may break aggregation of materials and further aid in the doping process.

At 820, the method may include heating the mixture. The mixture may be heated to a pre-sinter temperature prior to a sinter temperature, where the pre-sinter temperature may be less than the sinter temperature. In some examples, the pre-sinter temperature may be substantially equal to a temperature between 150 and 900° C. In further examples, the pre-sinter temperature may be substantially equal to a temperature between 150 to 750° C. The sinter temperature may be substantially equal to a temperature between 300 to 950° C. The mixture, which may be a solid, may be heated to the pre-sinter temperature for a first duration and to the sinter temperature for a second duration. During heating, Li may re-enter the NMC powder, thereby restoring future cathode energy output which would otherwise have been lost. In one example, the first duration is greater than the second duration. For example, the doped NMC powder may be heated to a pre-sinter temperature of 300° C. for three hours before heating the NMC powder to a sinter temperature of 750° C. for one hour. In additional or alternative examples, the mixture is heated to a single temperature between 100 to 950° C. In additional or alternative examples, the mixture is heated to a single temperature between 150 to 950° C.

In this way, a method for doping one or more metals into a cathode material via water in an environmentally benign manner to decrease costs is shown. The doping method utilizing water may further include no waste stream and no organic solvents being used while providing prolonged cycle life and a decreased likelihood of degradation. The technical effect of doping the one or more metals via a water based process rather than a precursor producing process or sintering process is to decrease manufacturing costs, process simplification (e.g., no handling of organic solvents), and decrease environmental impact.

In one example, a method comprises dissolving a dopant salt in water, the dopant salt comprising one or more metals having ionic radii greater than 60 picometers, forming a mixture of a nickel, manganese, and cobalt oxide (NMC) powder with the dopant salt in water, and subsequently heating the mixture to form a cathode material. A first example of the method further includes the metals being selected from one or more of strontium (Sr), barium (Ba), rubidium (Rb), cesium (Cs), zirconium (Zr), niobium (Nb), molybdenum (Mo), technetium (Tc), ruthenium (Ru), tungsten (W), platinum (Pt), neodymium (Nd), samarium (Sm), cerium (Ce), yttrium (Y), praseodymium (Pr), and lanthanum (La). A second example of the method, optionally including the first example, further includes each of the metals comprising an ionic radius 1.5 times greater than an ionic radius of nickel. A third example of the method, optionally including the first and/or second examples, further includes the cathode material comprising greater than or equal to 60% nickel. A fourth example of the method, optionally including one or more of the first through third examples, further includes the dopant salt being $NdI_3$. A fifth example of the method, optionally including one or more of the first through fourth examples, further includes the dopant salt being $Nd(NO_3)_3$. A sixth example of the method, optionally including one or more of the first through fifth examples, further includes the dopant salt being $Y(NO_3)_3$. A seventh example of the method, optionally including one or more of the first through sixth examples, further includes the dopant salt being $Y(CH_2COOH)_3$. An eighth example of the method, optionally including one or more of the first through seventh examples, further includes the dopant salt being dissolved into water at an amount between 0.01 to 15 wt. % of the NMC powder. A ninth example of the method, optionally including one or more of the first through eighth examples, further includes the dopant salt being dissolved into water at an amount equal to 3 wt. % of the NMC powder. A tenth example of the method, optionally including one or more of the first through ninth examples, further includes the heating the mixture including heating the mixture to a pre-sinter temperature and a sinter temperature, where the pre-sinter temperature is less than the sinter temperature, and where the pre-sinter temperature is between 150 to 900° C. and where the sinter temperature is between 300 to 950° C. An eleventh example of the method, optionally including one or more of the first through tenth examples, further includes the heating the mixture including heating the mixture to a temperature between 100 to 950° C.

In another example, a method for forming a cathode material comprises greater than or equal to 60% nickel, the method comprising dissolving a dopant salt in water, where the dopant salt comprises a metal having an atomic radius greater than 60 picometers, forming a mixture comprising an NMC powder and the dopant salt in water, heating a suspension of the mixture until dry, grounding the dry suspension, and sintering the grounded, dry suspension. A first example of the method further includes the dissolving the dopant salt including dissolving the dopant salt in only water. A second example of the method, optionally including the first example, further includes the dissolving the dopant salt including dissolving the dopant salt into water at 3 wt. % of the NMC powder, where the dopant salt is water-soluble. A third example of the method, optionally including the first and/or second examples, further includes the dopant salt being dissolved in water, an organic solvent, or a combination thereof. A fourth example of the method, optionally including one or more of the first through third examples, further includes the sintering including heating the NMC powder and the dopant salt to a temperature between 100 to 950° C.

In yet another example, a cathode material for a lithium ion battery comprises a nickel, cobalt, and manganese powder, where nickel forms greater than or equal to 60% of the powder, and a metal comprising an atomic radius greater than 60 picometers, where the metal is doped into the powder via water, wherein a secondary phase of the metal is arranged on surfaces of the cathode material. A first example of the cathode material further includes the secondary phase being uniformly arranged on surfaces of the cathode material. A second example of the cathode material, optionally including the first example, includes the metal being selected from Sr, Ba, Rb, Cs, Zr, Nb, Mo, Tc, Ru, W, Pt, Nd, Ce, and Y.

In a first example, an X-ray diffraction pattern shows that Y has been doped in NMC622 with all three doping methods (dry doping, wet doping, and diffusion doping). In a second example, optionally including the first example, diffusion doping with yttrium nitrate [$Y(NO_3)_3$] increases first charge capacity (FCC) and first discharge capacity (FDC) by increasing efficiency. In a third example, optionally including the first and/or second example, yttrium acetate [$Y(CH_2COOH)_3$] decreases FCC and FDC. In a fourth example, optionally including any of the first three examples, wet doping and dry doping Y into a precursor shows the same effect on FCC, FDC and cycle life. In a fifth example, optionally including any of the first four examples, a doping percentage should be ≤3%. In a sixth example, optionally including any of the previous five examples, Y doping can increase onset and peak temperatures without sacrificing FCC, FDC, and cycle life at optimized conditions. In a seventh example, optionally including any of the previous six examples, a selection of doping salts has little effect on electrochemical performance.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   dissolving a dopant salt in water, the dopant salt comprising one or more metals having ionic radii greater than 60 picometers;
   forming a nickel, manganese, and cobalt oxide (NMC) cathode material by mixing an NMC precursor with a lithium salt and sintering;
   after sintering to form the NMC cathode material, forming a mixture of the NMC cathode material with the dissolved dopant salt in the water; and
   heating the mixture to form a doped cathode material, wherein heating the mixture occurs immediately after forming the mixture and gradually evaporates the water, and wherein the dopant salt is uniformly deposited at a surface of the NMC cathode material as an amount of water decreases and lithium re-enters the NMC cathode material.

2. The method of claim 1, wherein the one or more metals are selected from one or more of strontium (Sr), barium (Ba), rubidium (Rb), cesium (Cs), zirconium (Zr), niobium (Nb), molybdenum (Mo), technetium (Tc), ruthenium (Ru), tungsten (W), platinum (Pt), neodymium (Nd), samarium (Sm), cerium (Ce), yttrium (Y), praseodymium (Pr), and lanthanum (La).

3. The method of claim 1, wherein the ionic radius of each of the one or more metals is 1.5 times greater than an ionic radius of nickel.

4. The method of claim 3, wherein the doped cathode material comprises greater than or equal to 60% nickel by weight.

5. The method of claim 1, wherein the dopant salt is $NdI_3$.

6. The method of claim 1, wherein the dopant salt is $Nd(NO_3)_3$.

7. The method of claim 1, wherein the dopant salt is $Y(NO_3)_3$.

8. The method of claim 1, wherein the dopant salt is $Y(CH_2COOH)_3$.

9. The method of claim 1, wherein the dopant salt is dissolved into the water at an amount between 0.01 to 15 wt. % of the NMC cathode material.

10. The method of claim 1, wherein the dopant salt is dissolved into the water at an amount equal to 3 wt. % of the NMC cathode material.

11. The method of claim 1, wherein the heating the mixture includes heating the mixture to a pre-sinter temperature and a sinter temperature, where the pre-sinter temperature is less than the sinter temperature, where the pre-sinter temperature is between 150 to 900° C., and where the sinter temperature is between 300 to 950° C.

12. The method of claim 1, wherein the heating the mixture includes heating the mixture to a temperature between 100 to 950° C.

13. A method for forming a doped cathode material comprising greater than or equal to 60% nickel by weight, the method comprising:
   dissolving a dopant salt in water, where the dopant salt comprises a metal having an atomic radius greater than 60 picometers;
   forming a nickel, manganese, and cobalt oxide (NMC) cathode material by mixing an NMC precursor with a lithium salt and sintering;
   after sintering to form the NMC cathode material, forming a mixture comprising the NMC cathode material and the dopant salt in the water;
   heating a suspension of the mixture until dry, wherein heating the suspension occurs immediately after forming the mixture and gradually evaporates the water, and wherein the dopant salt is uniformly deposited at a surface of the NMC cathode material as an amount of water decreases;
   grinding the dry suspension; and
   sintering the ground, dry suspension, wherein lithium re-enters the NMC cathode material.

14. The method of claim 13, wherein the dissolving the dopant salt includes dissolving the dopant salt in only the water.

15. The method of claim 13, wherein the dissolving the dopant salt includes dissolving the dopant salt into the water at 3 wt. % of the NMC cathode material, where the dopant salt is water-soluble.

16. The method of claim 13, wherein the dopant salt is dissolved in the water, an organic solvent, or a combination thereof.

17. The method of claim 13, wherein the sintering includes heating the NMC cathode material and the dopant salt to a temperature between 100 to 950° C.

18. A doped cathode material for a lithium ion battery, the doped cathode material comprising:
- a nickel, cobalt, and manganese powder, where nickel forms greater than or equal to 60% of the powder by weight; and
- a dopant comprising an atomic radius greater than 60 picometers, where the dopant is doped into the powder via water, wherein lithium re-enters the powder when the doped cathode material is heated; and
- wherein a secondary phase of the dopant is arranged uniformly on surfaces of the doped cathode material, the secondary phase causing an x-ray diffraction peak between a $2\theta$ of 20° and 40° that is missing from an x-ray diffraction plot of a corresponding undoped cathode material, and the dopant enlarges the crystal structure of the powder along a c-axis.

19. The doped cathode material of claim 18, wherein the dopant is selected from Sr, Ba, Rb, Cs, Zr, Nb, Mo, Tc, Ru, W, Pt, Nd, Ce, Y, and combinations thereof.

* * * * *